US 8,179,572 B2

(12) United States Patent
Jingu

(10) Patent No.: US 8,179,572 B2
(45) Date of Patent: May 15, 2012

(54) COMMUNICATION DEVICE

(75) Inventor: Hidehito Jingu, Tokyo (JP)

(73) Assignee: Oki Data Corporation, Tokyo (JP)

( * ) Notice: Subject to any disclaimer, the term of this patent is extended or adjusted under 35 U.S.C. 154(b) by 669 days.

(21) Appl. No.: 12/320,317

(22) Filed: Jan. 23, 2009

(65) Prior Publication Data
US 2009/0190184 A1 Jul. 30, 2009

(30) Foreign Application Priority Data

Jan. 25, 2008 (JP) ................. 2008-015275

(51) Int. Cl.
*H04N 1/40* (2006.01)
(52) U.S. Cl. ........ 358/444; 358/440; 358/448; 358/452; 358/468
(58) Field of Classification Search .................. 358/404, 358/407, 440, 444, 448, 450, 452, 462, 468; 379/100.01, 100.09
See application file for complete search history.

(56) References Cited

U.S. PATENT DOCUMENTS

| 5,933,478 | A | * | 8/1999 | Ozaki et al. ............. 379/100.08 |
| 6,208,427 | B1 | * | 3/2001 | Lee ............................. 358/1.15 |
| 6,301,010 | B1 | * | 10/2001 | Kajita ........................... 358/1.1 |
| 7,376,966 | B2 | * | 5/2008 | Okigami .......................... 726/4 |
| 7,852,504 | B2 | * | 12/2010 | Tanaka ........................ 358/1.15 |
| 2005/0005130 | A1 | * | 1/2005 | Okigami ...................... 713/183 |
| 2005/0091372 | A1 | * | 4/2005 | Nagao .......................... 709/224 |
| 2005/0105146 | A1 | * | 5/2005 | Tanaka ......................... 358/498 |
| 2007/0030999 | A1 | * | 2/2007 | Hyakutake et al. .......... 382/100 |
| 2008/0244351 | A1 | * | 10/2008 | Kato ............................ 358/405 |
| 2010/0150446 | A1 | * | 6/2010 | Codignotto .................. 382/186 |

FOREIGN PATENT DOCUMENTS
JP 2005-184655 7/2005
* cited by examiner

*Primary Examiner* — Kimberly A Williams
(74) *Attorney, Agent, or Firm* — Rabin & Berdo, P.C.

(57) ABSTRACT

A communication device receives and stores image data, and searches for information image data in the image data. If found, the information image data is removed, thereby shortening the image so that it can be completely reproduced on one page without compressing or clipping. The information image data may be added to the reproduced image as a watermark, or may be reinserted in a blank space in the image.

27 Claims, 22 Drawing Sheets

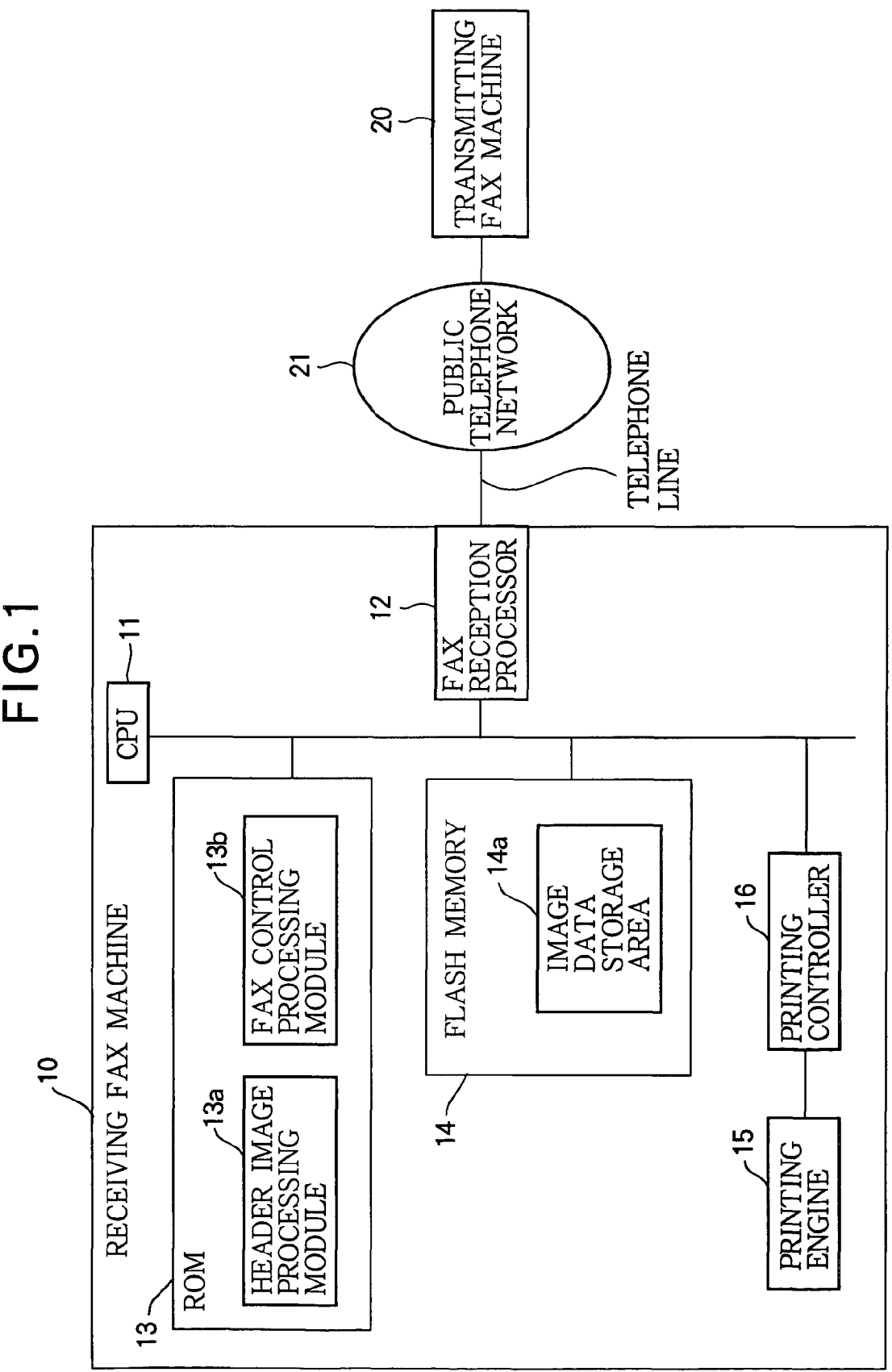

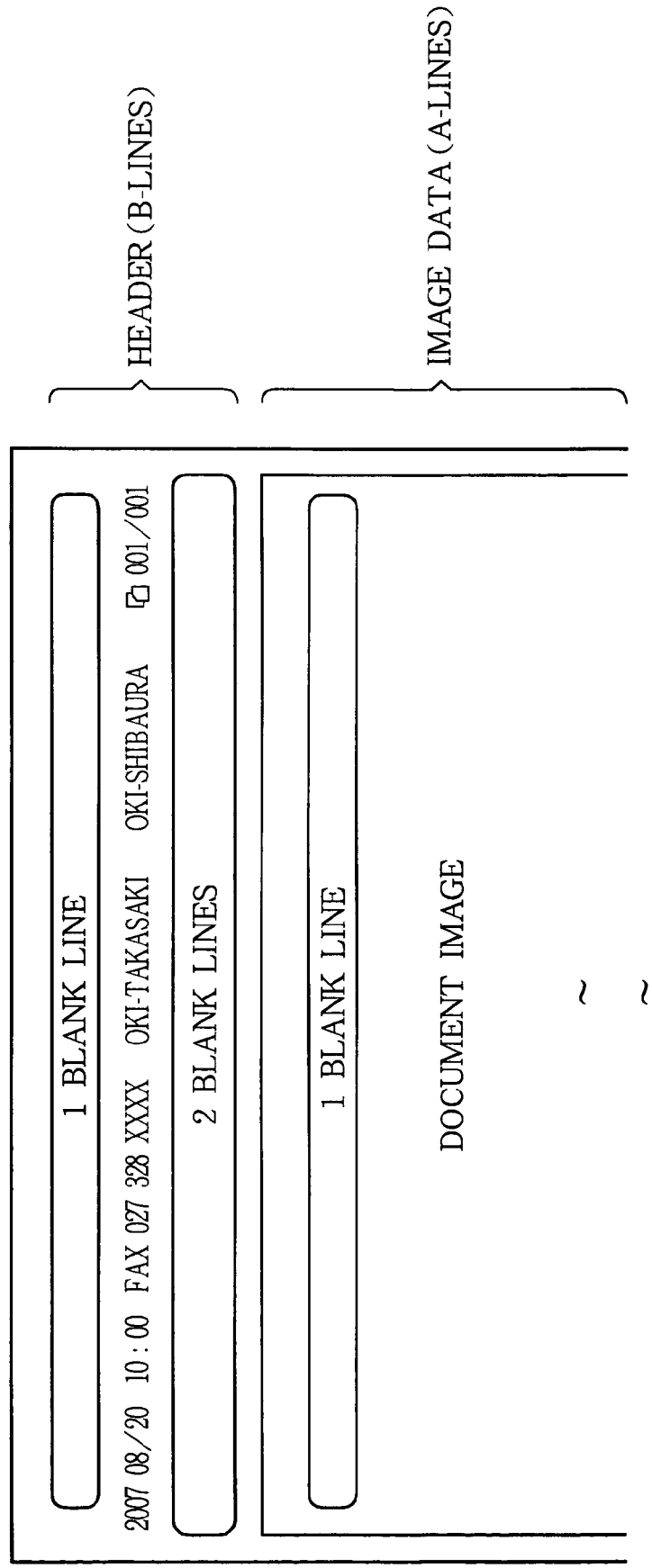

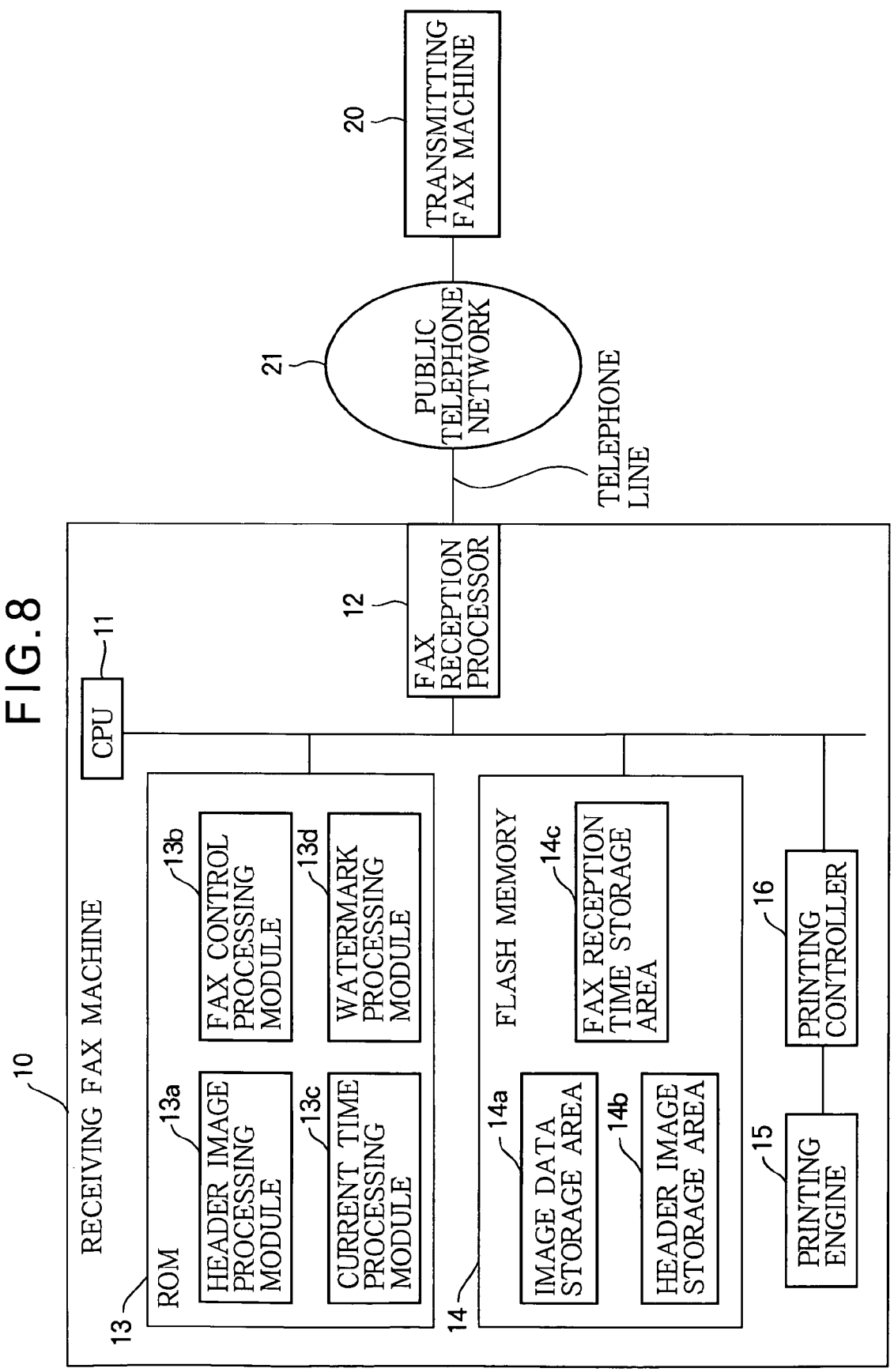

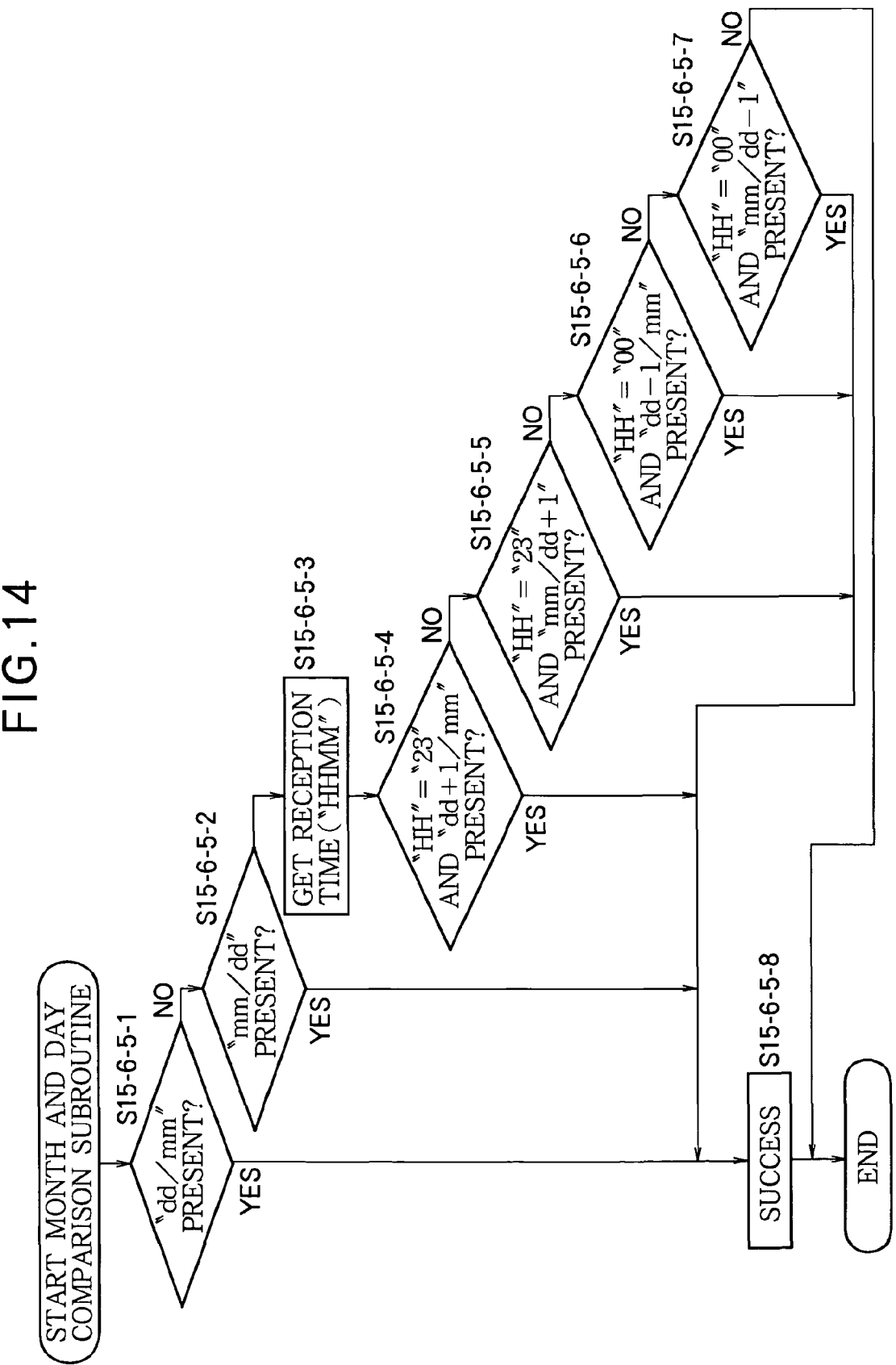

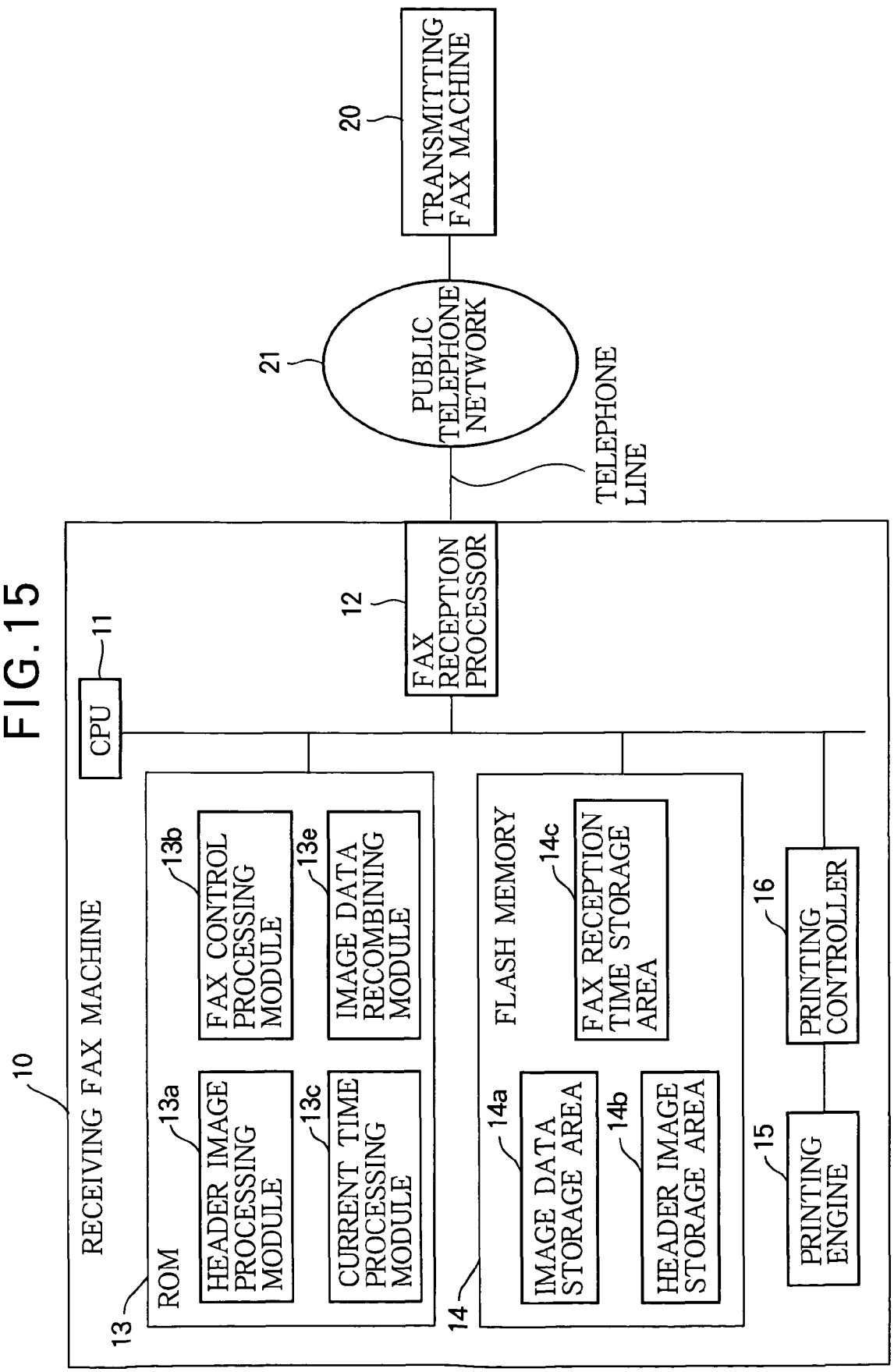

COMMUNICATION DEVICE

BACKGROUND OF THE INVENTION

1. Field of the Invention

The present invention relates to a communication device, such as a facsimile machine, that receives transmitted documents.

2. Description of the Related Art

To leave evidence of the transmission of important documents, such as legal documents, some facsimile machines can be set to print a transmission record indicating the time, date, source, and destination of the transmission, the number of pages transmitted, whether the transmission succeeded or failed, and other information. The transmission record may also include a clipped or compressed image of the first transmitted page, printed below the transmission record itself. One description of this process is given by Soneoka in Japanese Patent Application Publication No. 2005-184655. Soneoka notes that clipping or compressing the image of the first page makes it hard to read and can lead to the loss of essential information, and proposes printing the image of the first page on the reverse side of the transmission record instead, but this requires a facsimile machine with a double sided printing capability.

Similar problems arise at the receiving end if the transmitting facsimile machine adds a header to each transmitted page, typically giving the time, date, source, and destination of the transmission and a page number. To make space for the header information, the original image may have to be compressed, or part of the original image may have to be discarded. The header is added nevertheless because of its great utility in keeping track of the received document pages and otherwise managing the received document.

The compression or partial discarding of the transmitted image means, however, that the recipient of the document cannot get an exact copy of the original document, which is always annoying and sometimes makes the received document invalid or useless, not only when the document is a legal document but also when the document is a technical drawing or some other document that must be reproduced fully and exactly.

SUMMARY OF THE INVENTION

An object of the present invention is to provide a novel communication device that can reproduced transmitted documents fully and accurately by removing added header information.

The novel communication device has a receiving unit for receiving image data, a memory unit for storing the received image data, an image processing unit that searches in the stored image data for header information added at the source of the transmission and modifies the received image data by removing the header information, and a recording unit for recording the modified image data on a recording medium.

The received image data may include first image data and second image data received following the first image data. As header information, the first image data includes transmitting device information about the transmitting device which is the source of the transmission. The second image data are data that have been processed (e.g., created, edited, or encoded) by the transmitting device. The memory unit stores the first image data and the second image data as one item or file of continuous image data.

The modified image data represent the original image, before the header information was added. The novel communication device can accordingly make faithful copies of legal documents, technical drawings, and other such documents, even when they are received with added headers or other transmitting device information.

BRIEF DESCRIPTION OF THE DRAWINGS

In the attached drawings:

FIG. 1 is a block diagram of a facsimile machine illustrating a first embodiment of the invention;

FIG. 2 illustrates the header format in the first embodiment;

FIG. 8 is a block diagram of a facsimile machine illustrating a second embodiment of the invention;

FIG. 14 is a more detailed flowchart illustrating the month and day comparison process in FIG. 13;

FIG. 15 is a block diagram of a facsimile machine illustrating a third embodiment of the invention;

DETAILED DESCRIPTION OF THE INVENTION

Figure 3A:
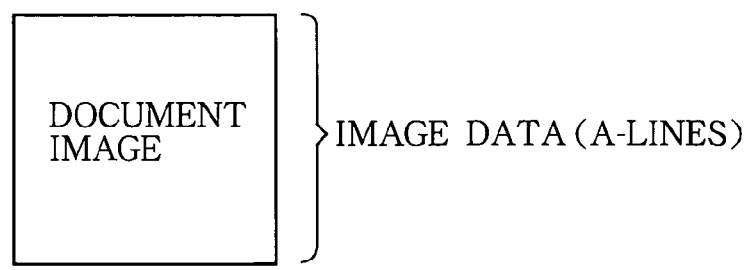
FIGS. 3A, 3B, and 3C illustrate the adding of header information and the restoration of the original image data in the first embodiment.

Embodiments of the invention will now be described with reference to the attached drawings, in which like elements are indicated by like reference characters.

First Embodiment

Referring to FIG. 1, the first embodiment is a receiving facsimile (FAX) machine 10 having a central processing unit (CPU) 11, a receiving unit or facsimile reception processor 12, a read-only memory (ROM) 13, a memory unit or flash memory 14, and a recording unit including a printing engine 15 and a printing controller 16. The receiving facsimile machine 10 is connected to a transmitting facsimile machine 20 through a network 21.

The receiving facsimile machine 10 may be simply a facsimile machine, or it may be a multifunction printer with, for example, printing, scanning, copying, and facsimile transmitting and receiving functions, or more generally any device or system equipped to receive facsimile image data and record the received facsimile image on paper or another suitable medium. In the description below, it will be assumed that the receiving facsimile machine 10 is simply a facsimile machine.

The received facsimile image may be a monochrome image or a color image, and the printing engine 15 may use any known method of recording the received image, including inkjet, electrophotographic, thermal transfer, and other methods. In the description below, it will be assumed that the image is monochrome and the printing engine 15 is electrophotographic.

The network 21 may be the Internet, an intranet, a local area network (LAN), or any other type of network capable of transmitting facsimile image data. It will be assumed below that the network 21 is a public telephone network to which the receiving facsimile machine 10 and transmitting facsimile machine 20 are connected by telephone lines.

The CPU 11 is a computing device that executes programs stored in the ROM 13 to control the operation of the other parts of the receiving facsimile machine 10.

The facsimile reception processor 12 provides an interface between the receiving facsimile machine 10 and the public telephone network 21 and communicates with the transmitting facsimile machine 20 by a well-known protocol, which will not be described here.

The ROM 13 stores program code including a header image processing module 13a for searching for and removing header information included in facsimile image data received from the transmitting facsimile machine 20, and a facsimile control processing module 13b for controlling the facsimile reception processor 12. The CPU 11 and header image processing module 13a combine to form an image processing unit, or more precisely, the part of the image processing unit that is relevant to the present invention.

The receiving facsimile machine 10 also includes a switch or other means (not shown) for enabling and disabling the header image processing module 13a.

The flash memory 14 has an image data storage area 14a for storing facsimile image data received from the transmitting facsimile machine 20.

The printing engine 15 includes, for example, a printing head and a paper feeding mechanism adapted for printing facsimile images on paper or similar media. The printing controller 16 controls the operation of the printing engine 15.

When the transmitting facsimile machine 20 sends facsimile image data to the receiving facsimile machine 10, it may add header information to the data. The transmitted data, including the header information, are received by the facsimile reception processor 12 and stored in the image data storage area 14a. The header image processing module 13a searches for the header information in the stored data, modifies the stored data by removing the header information, and stores the resulting modified facsimile image data in the image data storage area 14a again. The printing controller 16 reads the modified facsimile image data from the image data storage area 14a and controls the printing engine 15 so as to record the modified facsimile image data on the recording media.

The header information is added to the facsimile image data in the format shown in FIG. 2, to be recorded above the facsimile image data on the recording media. As shown, there are blank lines above and below the header information. The search algorithm in the header image processing module 13a accordingly starts by searching for initial blank lines at the top of the received facsimile image data. If there is no initial blank line, the header is assumed to be absent.

If an initial blank line is found, the header image processing module 13a counts the number of blank lines until the first non-blank line is found. If the count reaches a first predetermined value such as five lines, the header is assumed to be absent and the search ends.

If a non-blank line is found within the first predetermined number of lines, the header image processing module 13a counts the number of non-blank lines that occur consecutively until another blank line is encountered. If the next blank line is not found within a second predetermined number of lines such as three lines, the header is assumed to be absent and the search ends. If a blank line is found within the second predetermined number of lines, then the consecutive preceding non-blank lines and a third predetermined number of blank lines, such as one blank line, preceding and following the consecutive non-blank lines are presumed to constitute the header. These header lines are also referred to as B-lines; non-header lines are referred to as A-lines.

The first, second, and third predetermined numbers of lines are not limited to the exemplary values of five, three, and one given above. In the flowcharts that follow, the top margin and header body both have permissible lengths of one to four lines.

Figure 3B:
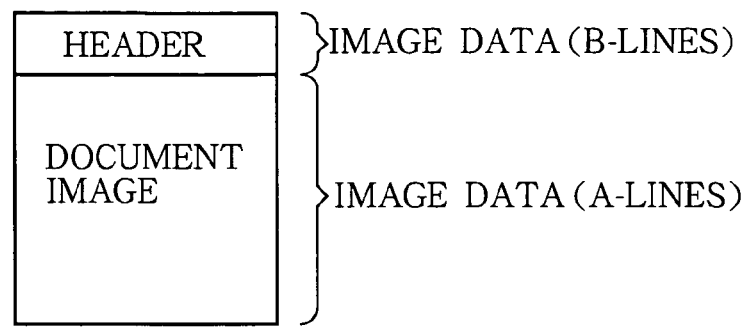
Figure 3C:
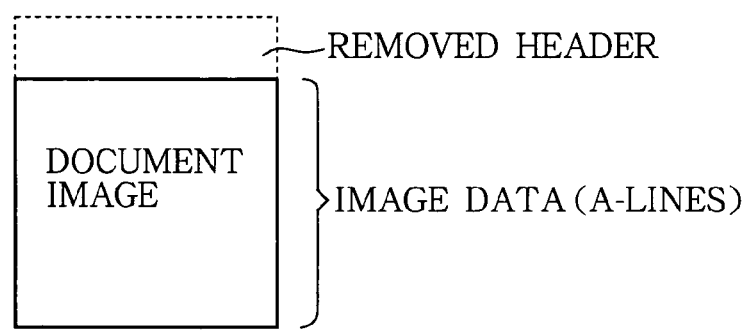

Next, the restoration of the image data will be described. FIG. 3A represents the original facsimile image data before transmission by the transmitting facsimile machine 20¥. FIG. 3B represents the facsimile image data received by the receiving facsimile machine 10¥. FIG. 3C represents the modified facsimile image data obtained by removing the header.

As shown in FIG. 3A, no header is included in the original facsimile image data. Therefore, as shown in FIG. 3B, the length of the facsimile image received by the receiving facsimile machine 10 is increased by the number of header lines added by the transmitting facsimile machine 20. To print the lengthened facsimile image, it would be necessary to discard part of the image or reduce the size of the image, so as shown in FIG. 3C, the facsimile image data are modified by removing the header. The number of lines in the modified facsimile image data is the same as the number of lines in the original facsimile image data.

Figure 4:
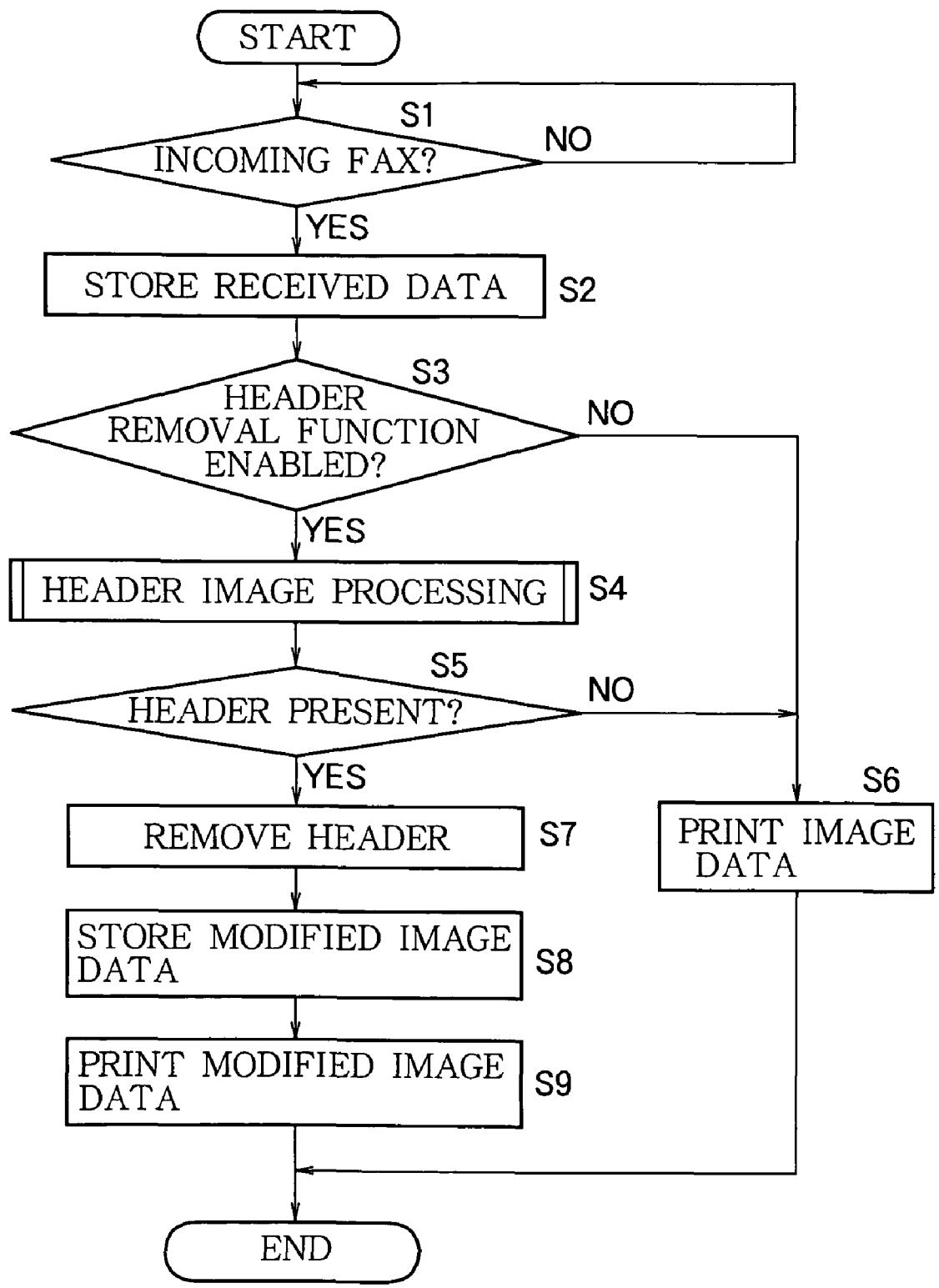
FIG. 4 is a flowchart illustrating the operation of the facsimile machine in the first embodiment.

The overall operation of the receiving facsimile machine 10 in the first embodiment is shown in the flowchart in FIG. 4. The extra vertical lines in the box enclosing step S4 (and other steps in subsequent flowcharts) indicate that the step is executed as a subroutine.

In step S1 the facsimile reception processor 12 checks the telephone line to detect an incoming facsimile transmission from the transmitting facsimile machine 20. This step is repeated until an incoming facsimile transmission is detected; then the facsimile reception processor 12 proceeds to step S2.

In step S2 the facsimile reception processor 12 stores the received facsimile image data in the image data storage area 14a.

In step S3 the above-mentioned switch or other means is checked to see whether the header removal function is enabled or disabled.

In step S4 if the header removal function is enabled, it searches for header information in the received facsimile image data. In step S5, as a result of the search, the header image processing module 13a decides whether a header is present or absent.

If a header is determined to be absent in step S5, or if the header image processing module 13a is disabled in step S3, then in step S6, the printing controller 16 reads the facsimile image data from the image data storage area 14a and passes the facsimile image data to the printing engine 15, which prints the facsimile data as received. If the facsimile image has been lengthened by the addition of a header, the printing controller 16 clips or compresses the image so that it will fit on one page.

If the header removal function is enabled and a header is present, then in step S7, following the decision in step S5, the header image processing module 13a modifies the facsimile image data by removing the header lines.

In step S8 the header image processing module 13a stores the modified facsimile image data, without the header, in the image data storage area 14a.

In step S9 the printing controller 16 reads the modified facsimile image data from the image data storage area 14a and the printing engine 15 prints the modified facsimile image, which is identical to the original image.

Figure 5:
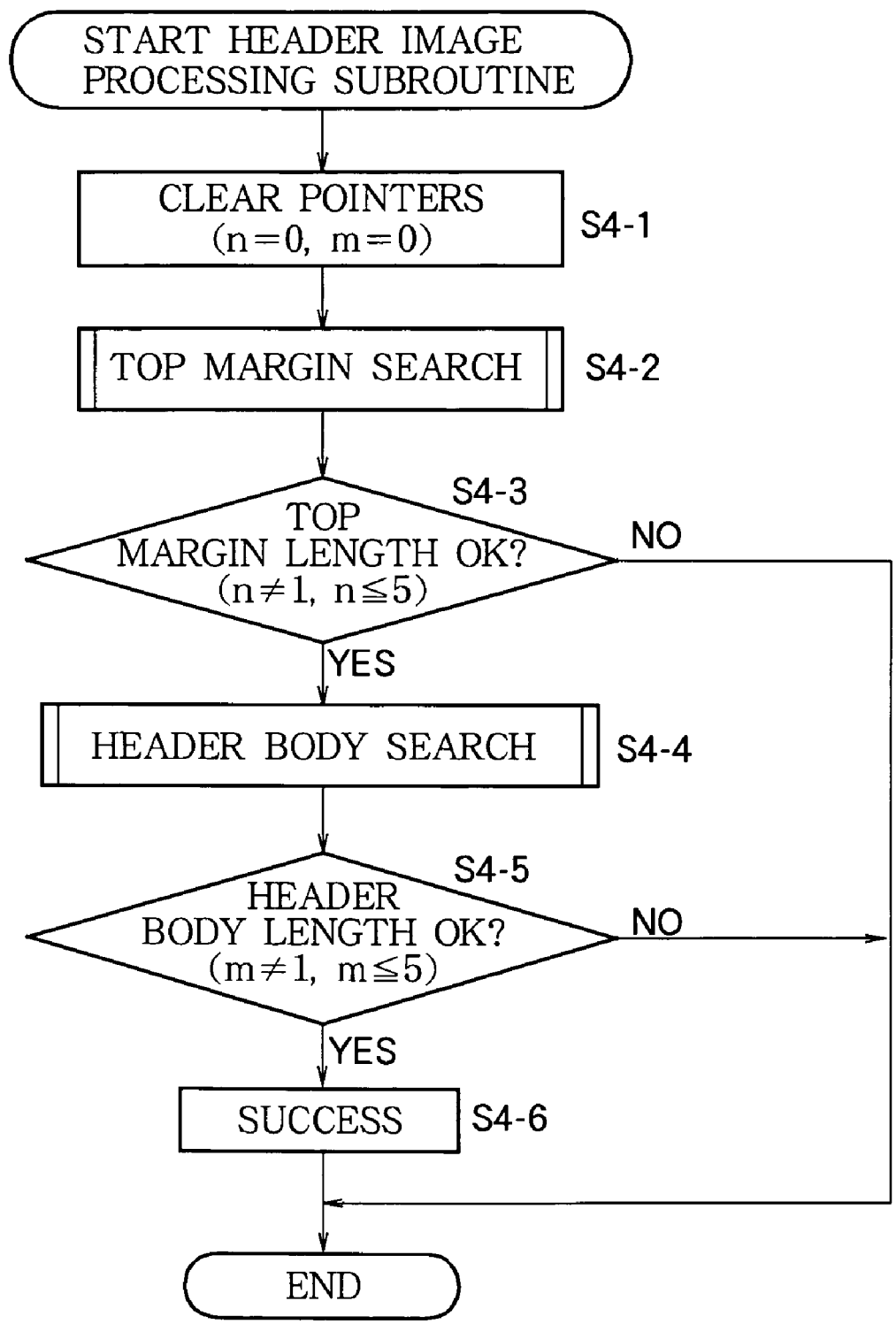
FIG. 5 is a more detailed flowchart illustrating the search process in FIG. 4.

The header search subroutine in step S4 will now be described in further detail with reference to the flowchart in FIG. 5.

In step S4-1 the header image processing module 13a clears two pointers designated by the letters m and n to zero (m=0, n=0). Pointer n is used in finding the first line of the header body. Pointer m is used in finding the first blank line following the header body.

In step S4-2 the header image processing module 13a measures the top margin of the facsimile image by advancing pointer n up to the first non-blank line.

In step S4-3 the header image processing module 13a decides whether the length of the top margin is within the prescribed limits for a header (one to four lines). If it is not, the subroutine ends in failure. If the top margin length is within the prescribed limits, the subroutine to step S4-4.

In step S4-4 the header image processing module 13a measures the length of the header body by advancing pointer m from the first non-blank line up to the next blank line.

In step S4-5 the header image processing module 13a decides whether the length of the header body is within the prescribed limits for a header (one to four lines). If it is not, the subroutine ends in failure. If the header body length is within the prescribed limits, then in step S4-6 the subroutine returns information indicating that the header search has succeeded.

Figure 6:
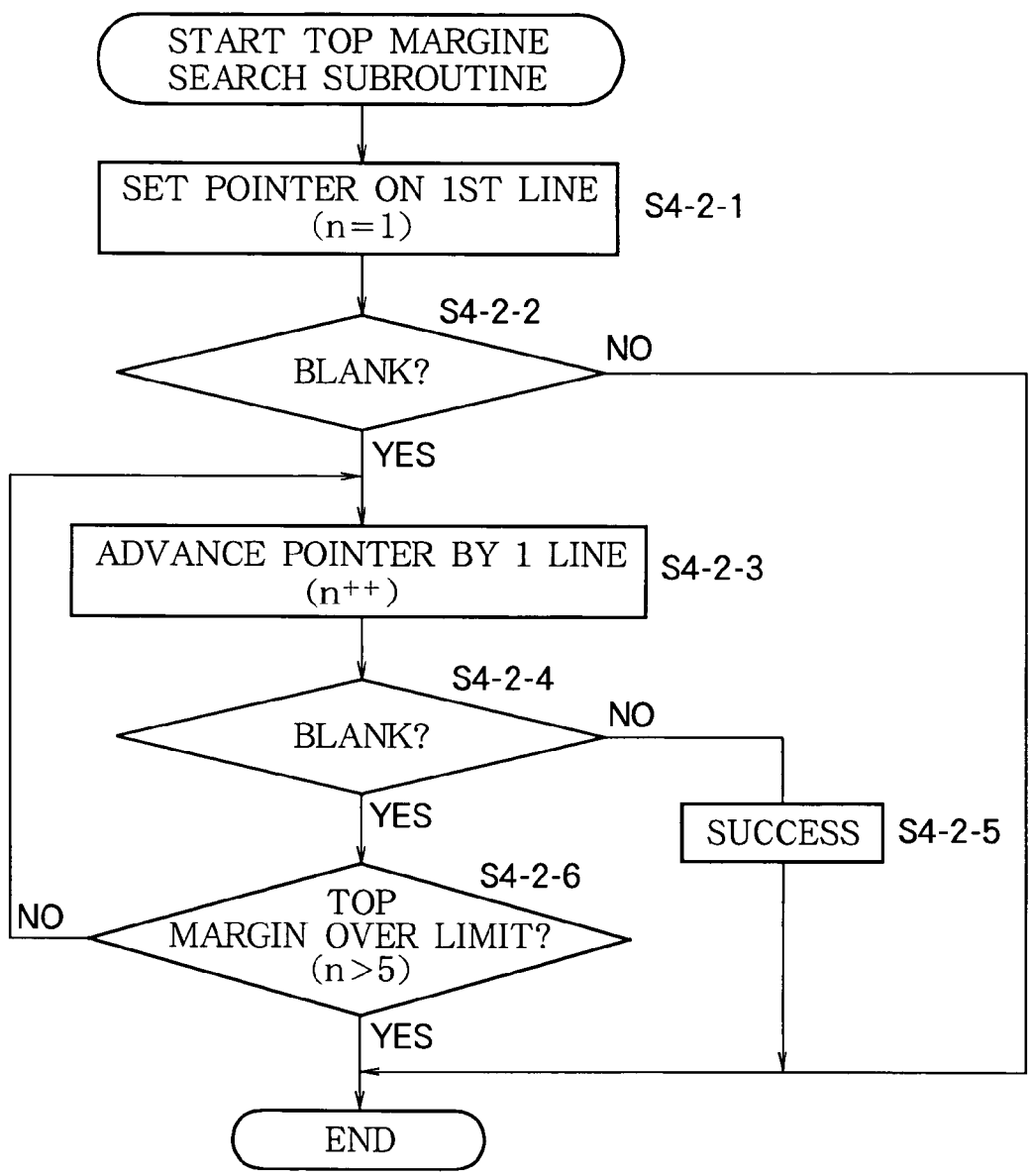
FIG. 6 is a more detailed flowchart illustrating the top margin search process in FIG. 5.

The top margin search subroutine in step S4-2 in FIG. 5 will now be described in further detail with reference to the flowchart in FIG. 6.

In step S4-2-1 pointer n is incremented by one so that it is set on the first line (n=1).

In step S4-2-2 the header image processing module 13a determines whether the line on which pointer n is set is blank or not. If the line is not blank, the subroutine ends in failure. If the line is blank, the process proceeds to step S4-2-3.

In step S4-2-3 pointer n is incremented by one again (indicated by the notation n++) to advance to the next line.

In step S4-2-4 the header image processing module 13a determines whether the line on which pointer n is set is blank or not, proceeding to step S4-2-6 if the line is blank and to step S4-2-5 if the line is not blank.

In step S4-2-5 the subroutine returns information indicating that the top margin search has succeeded.

In step S4-2-6 the header image processing module 13a tests the value of n to decide whether the number of blank lines found so far exceeds the limit for a header (n>5). If so, the subroutine ends in failure. If not, the subroutine returns to step S4-2-3.

Figure 7:
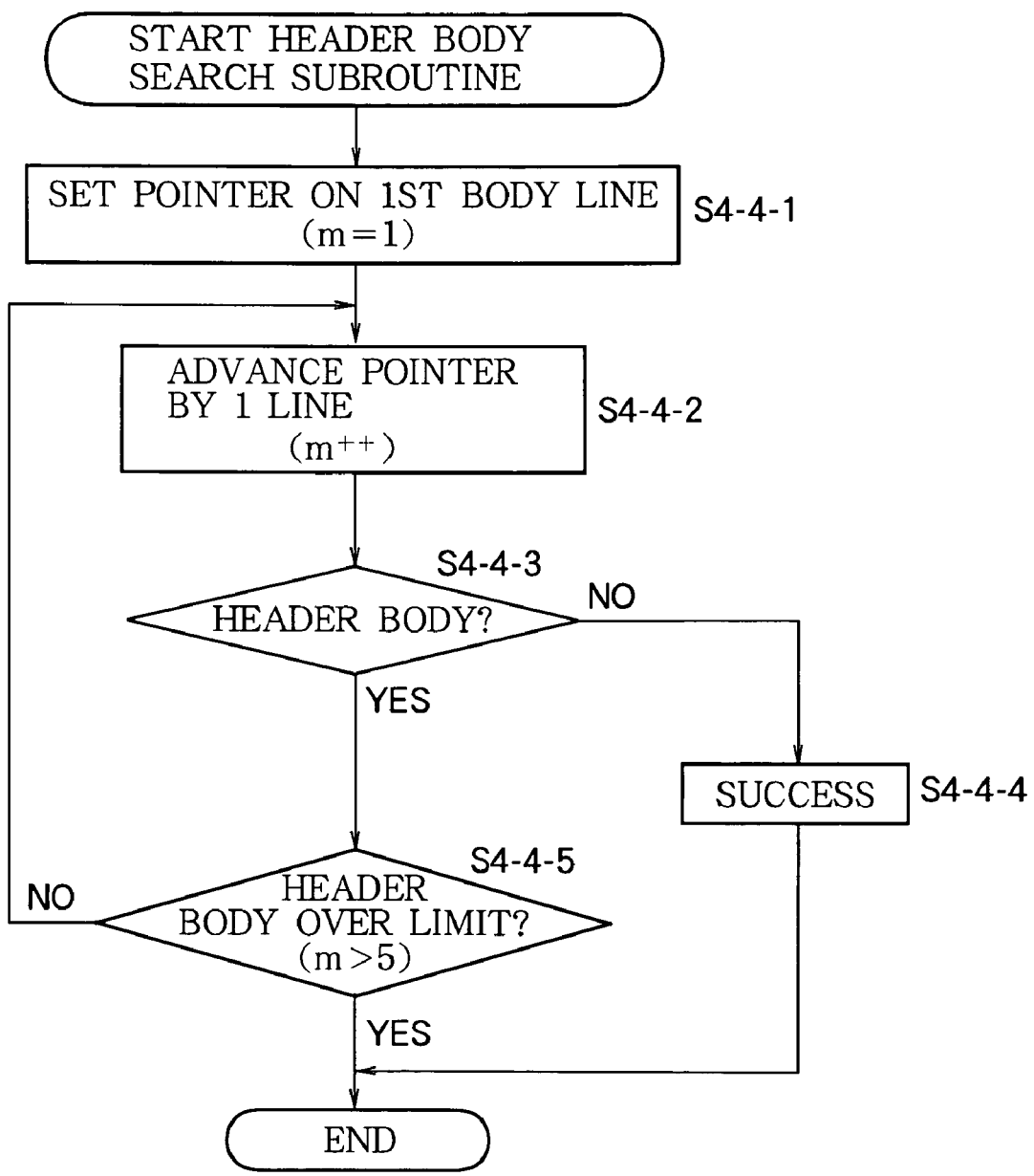
FIG. 7 is a more detailed flowchart illustrating the header body and bottom margin search process in FIG. 5.

The header body search subroutine in step S4-4 in FIG. 5 will now be described in further detail with reference to the flowchart in FIG. 7.

In step S4-4-1 pointer m is incremented by one so that it is set on the first non-blank line at the top of the page (m=1).

In step S4-4-2 pointer m is incremented by one again to advance to the next line.

In step S4-4-3 the header image processing module 13a determines whether the line on which pointer m is set is blank or not, proceeding to step S4-4-4 if the line is blank and to step S4-4-5 if the line is not blank.

In step S4-4-4 the subroutine returns information indicating that the header body search has succeeded.

In step S4-4-5 the header image processing module 13a tests the value of m to decide whether the number of non-blank lines found so far exceeds the limit for a header body (m>5). If so, the subroutine ends in failure. If not, the subroutine returns to step S4-4-2.

It is contemplated that the process described in the flowcharts above may be performed in parallel with other facsimile operations performed by facsimile machines in general, which do not execute the process described above, and that the facsimile machine may switch operating modes, either on its own decision or in response to a command from a human user.

It is also contemplated that the program code for searching for the header may be updated by the user, or updated automatically from the Internet.

It is also contemplated that in the DTS/DTC/DCS (digital command signal, digital identification signal, digital transmit command) negotiation process at the beginning of a facsimile transmission, the receiving facsimile machine 10 may inform the transmitting facsimile machine 20 of the largest paper size it can use, to prevent needless compression of the facsimile image by the transmitting facsimile machine 20.

It is also contemplated that instead of counting blank and non-blank lines as described above, the receiving facsimile machine 10 may receive header format information from the transmitting facsimile machine 20 and remove a fixed number of header lines as specified in the format information.

It is similarly contemplated that instead of counting blank and non-blank lines as described above, the receiving facsimile machine 10 may recognize the header by counting backward from the last line in the received facsimile image, or recognize the header from information embedded in the facsimile image data to indicate the boundary between the original facsimile image and the header.

In short, the receiving facsimile machine 10 in the first embodiment recognizes the header from its position and length, or equivalent format information, and removes the header in order to print a more faithful facsimile image of the original document, a feature of great utility when the document is a legal document, a technical drawing, or some other document that must be reproduced accurately.

The first embodiment also enables accurate reproduction to be obtained without double sided printing.

Second Embodiment

Referring to FIG. 8, the receiving facsimile machine 10 in the second embodiment has the same structure as in the first embodiment, except that the ROM 13 also includes a current time processing module 13c for managing the present time and date in the receiving facsimile machine 10 and a watermark processing module 13*d* for creating a watermark by editing header information, and the flash memory 14 further includes a header image storage area 14*b* for storing header information extracted from the image data and a facsimile reception time storage area 14*c* for storing the time and date of reception of a facsimile transmission.

The communication procedure between the transmitting facsimile machine 20 and the receiving facsimile machine 10 is the same as in the first embodiment, so a description will be omitted.

As in the first embodiment, facsimile image data are received by the facsimile reception processor 12 and stored in the image data storage area 14*a*. The starting time and date of the facsimile reception are stored in the facsimile reception time storage area 14*c* as the facsimile reception time and date. The header image processing module 13*a* searches for header information in the image data stored in the image data storage area 14*a*, modifies the stored data by removing the header information, stores the resulting modified facsimile image data in the image data storage area 14*a* again, and stores the removed header information in the header image storage area 14*b*. The watermark processing module 13*d* creates watermark data from the header information stored in the header image storage area 14*b*, and combines the watermark with the modified facsimile image data stored in the image data storage area 14*a*.

The header search algorithm is conducted as in the first embodiment, but to make the search more accurate, the content of the header body is also examined. Although the header content is not standardized and may include different information depending on the facsimile machine vendor, there is always information about the time (xx:yy) and date (yyyy/mm/dd) of transmission and a page number (xxx/yyy), in the formats indicated in parentheses or equivalent formats. In the second embodiment, the time and date of transmission are used to strengthen the header search conditions.

Specifically, the header body is searched to see if it contains information consistent with the facsimile reception time and date stored in the facsimile reception time storage area 14*c*. For the year of transmission, the header information must include text matching the four-digit (yyyy) or two-digit (yy) year data in the facsimile reception time storage area 14*c*. Since the internal clocks of the two machines may not be in agreement and the year may change while the facsimile is being sent from the transmitting facsimile machine 20 to the receiving facsimile machine 10, however, if the day of reception is the first or last day of the year, text matching the preceding or following year is also accepted.

For the month and day of transmission, the header must include text matching the month and day data (mm/dd or dd/mm) stored in the facsimile reception time storage area 14*c*. Since the day may change while the facsimile is being sent from the transmitting facsimile machine 20 to the receiving facsimile machine 10, and to allow for clock disagreement, when the hour of reception is '00' or '23', text matching the preceding or following day is also accepted.

For the time of transmission, to allow for clock disagreement, the only check made is whether the header includes a pair of two-digit numbers separated by a colon (xx:xx).

Known technology employed in printer drivers in known image forming apparatus may be used to create a watermark from the header information and combine the watermark with the image data, so detailed descriptions of these processes will be omitted.

Figure 9A:
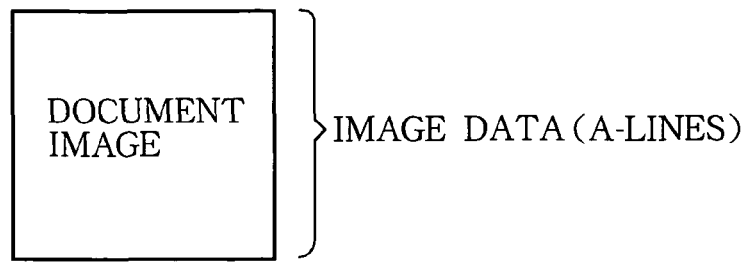
FIGS. 9A, 9B, and 9C illustrate the adding of header information and the restoration of the original image data in the second embodiment.
Figure 9B:
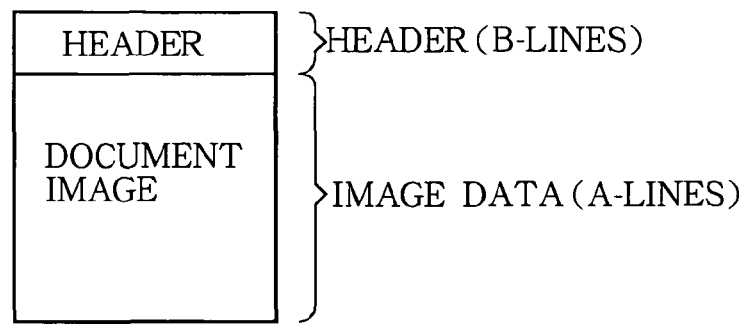
Figure 9C:
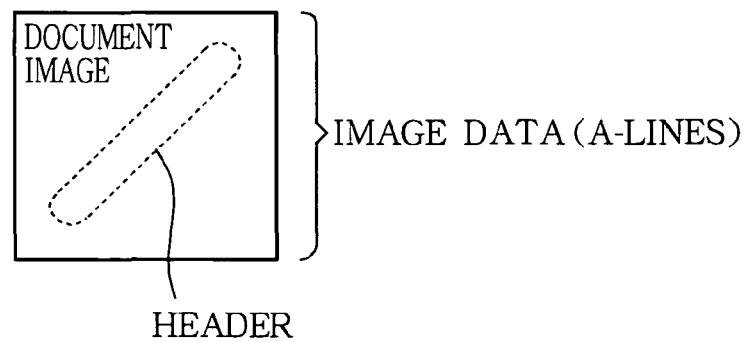

The general operation of the second embodiment is illustrated in FIGS. 9A to 9C. FIG. 9A depicts the image data before transmission from the transmitting facsimile machine, consisting only of A-lines without header information; FIG. 9B depicts the image data received by the receiving facsimile machine, consisting of both A-lines and B-lines (header information); FIG. 9C depicts the image printed by the receiving facsimile machine, in which the header has been removed, then added to the image as a watermark.

Figure 10:
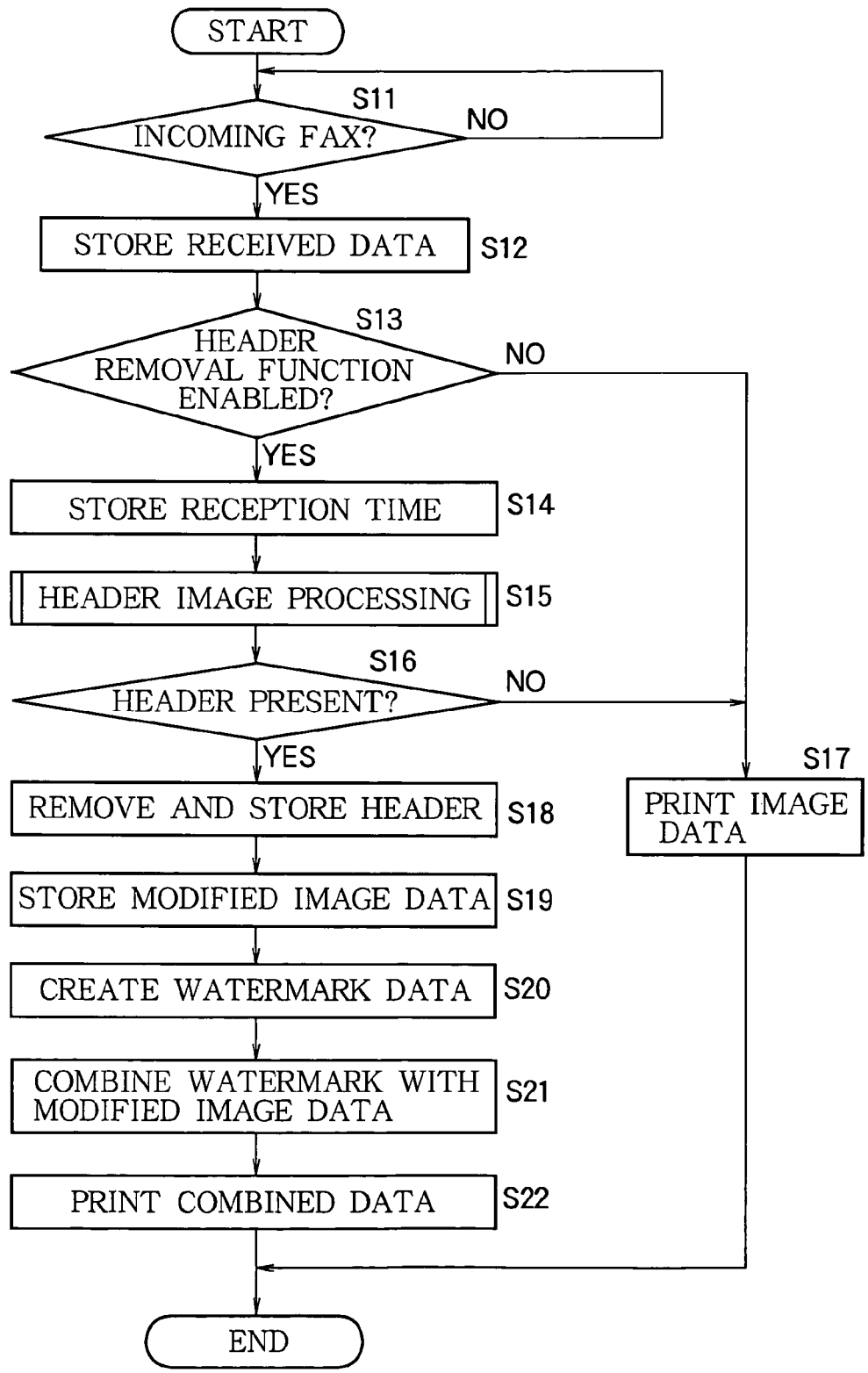
FIG. 10 is a flowchart illustrating the operation of the facsimile machine in the second embodiment.

The overall operation of the receiving facsimile machine 10 in the second embodiment is shown in the flowchart in FIG. 10.

In step S11 the facsimile reception processor 12 checks the telephone line to detect an incoming facsimile transmission from the transmitting facsimile machine 20. This step is repeated until an incoming facsimile transmission is detected; then the facsimile reception processor 12 proceeds to step S12.

In step S12 the facsimile reception processor 12 stores the received facsimile image data in the image data storage area 14*a*.

In step S13 the switch or other means mentioned in the first embodiment is checked to see whether the header removal function is enabled or disabled.

If the header removal function is enabled, then in step S14, the header image processing module 13*a* obtains the facsimile reception time and date from the current time processing module 13*c*, stores it in facsimile reception time storage area 14*c*, and proceeds to step S15.

In step S15 the header image processing module 13*a* searches for header information in the received facsimile image data. In step S16, from the result of the search, the header image processing module 13*a* decides whether a header is present or absent.

If a header is determined to be absent in step S16, or if the header image processing module 13*a* is disabled in step S13, then in step S17, the printing controller 16 reads the facsimile image data from the image data storage area 14*a* and passes the facsimile image data to the printing engine 15, which prints the facsimile data as in the first embodiment.

If the header removal function is enabled and a header is present, then in step S18, following the decision in step S16, the header image processing module 13*a* modifies the facsimile image data by removing the header lines and stores the removed header lines as image data in the header image storage area 14*b*.

In step S19 the header image processing module 13*a* stores the modified facsimile image data, without the header, in the image data storage area 14*a*.

In step S20 the watermark processing module 13*d* creates watermark data from the header lines stored in the header image storage area 14*b* in step S18.

In step S21 the header image processing module 13*a* combines the modified facsimile image data stored in the image data storage area 14*a* and the watermark data created in step S20 and stores the combined data in the image data storage area 14*a* again.

In step S22 the printing controller 16 reads the combined facsimile image data from the image data storage area 14*a* and the printing engine 15 prints the combined facsimile image, which shows all of the original image, with a superimposed watermark.

Figure 11:
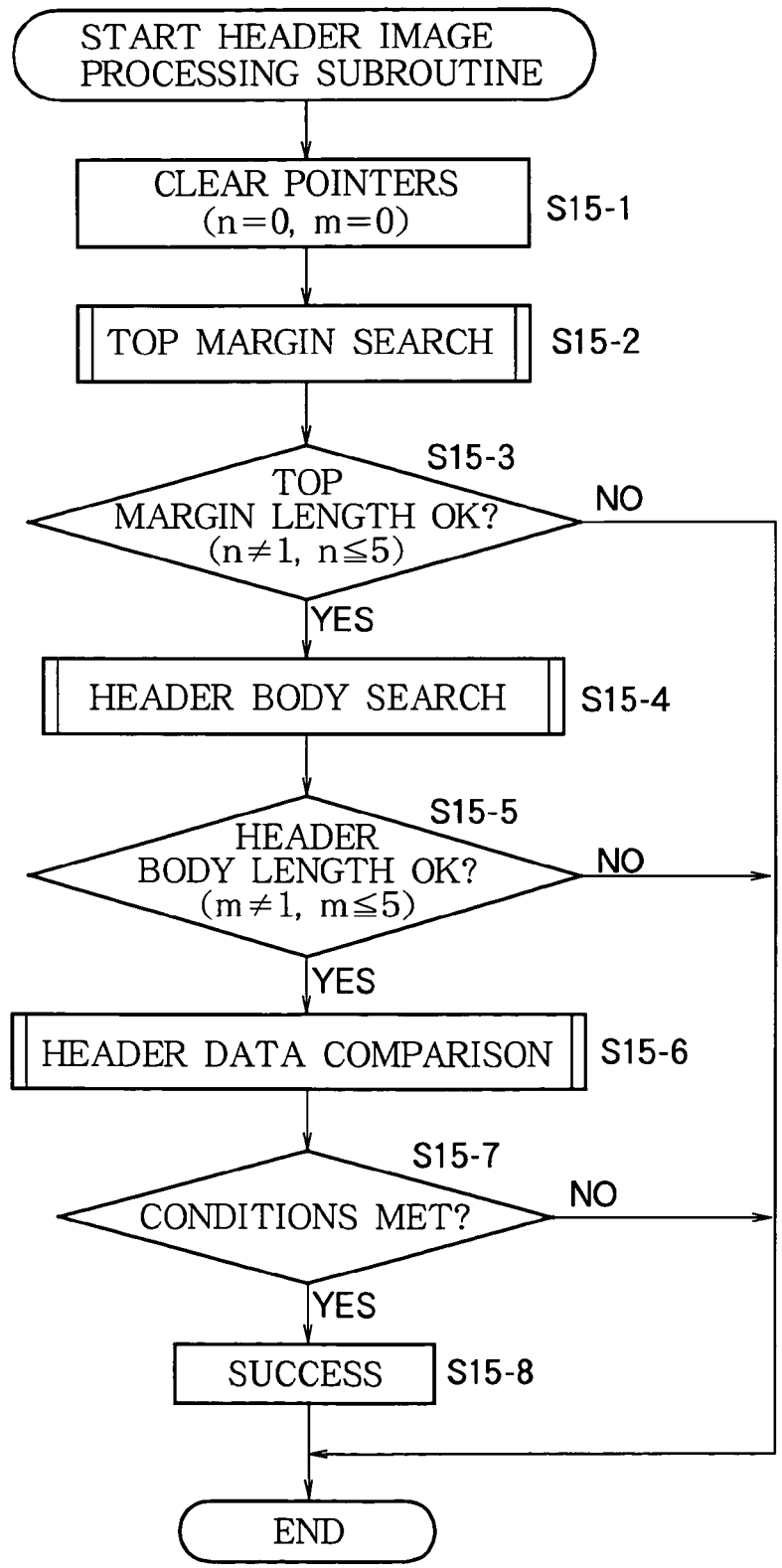
FIG. 11 is a more detailed flowchart illustrating the search process in FIG. 10.

The header search subroutine in step S15 in FIG. 10 will now be described in further detail with reference to the flowchart in FIG. 11.

In step S15-1 the header image processing module 13*a* clears two pointers designated by the letters m and n to zero (m=0, n=0). These pointers are used as in the first embodiment, to find the first line of the header body and the first blank line following the header body.

In step S15-2 the header image processing module 13a measures the top margin of the facsimile image by advancing pointer n up to the first non-blank line.

In step S15-3 the header image processing module 13a decides whether the length of the top margin is within the prescribed limits for a header (one to four lines). If it is not, the subroutine ends in failure. If the top margin length is within the prescribed limits, the subroutine proceeds to step S15-4.

In step S15-4 the header image processing module 13a measures the length of the header body by advancing pointer m from the first non-blank line up to the next blank line.

In step S15-5 the header image processing module 13a decides whether the length of the header body is within the prescribed limits for a header (one to four lines). If it is not, the subroutine ends in failure. If the header body length is within the prescribed limits, the subroutine proceeds to step S15-6.

In step S15-6 the header image processing module 13a compares the presumed header information with predetermined conditions.

In step S15-7 the header image processing module 13a decides whether the predetermined conditions are met. If the conditions are met, the subroutine proceeds to step S15-8; otherwise, the subroutine ends in failure.

In step S15-8 the subroutine returns information indicating that the header search has succeeded.

The operation of the top margin search subroutine and header body search subroutine is the same as in the first embodiment, so descriptions will be omitted.

Figure 12:
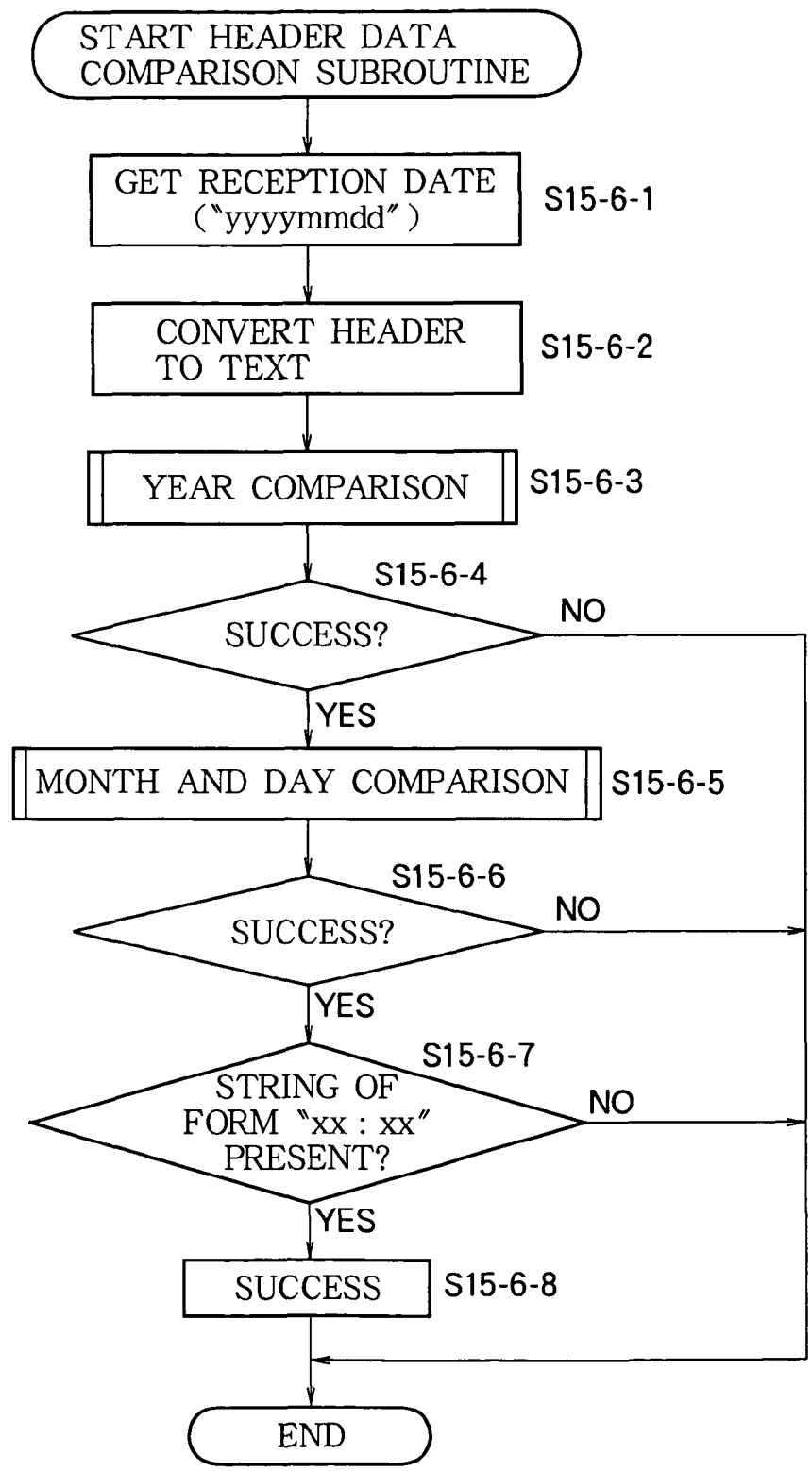
FIG. 12 is a more detailed flowchart illustrating the character string comparison process in FIG. 11.

The header data comparison subroutine in step S15-6 in FIG. 11 will now be described in further detail with reference to the flowchart in FIG. 12.

In step S15-6-1 the header image processing module 13a retrieves the facsimile reception date from the facsimile reception time storage area 14c. In step S15-6-2 the header image processing module 13a converts the information in the presumed header lines to text data by well-known optical character recognition (OCR) technology, and stores the text data in the flash memory 14.

In step S15-6-3 the header image processing module 13a compares the text data with the facsimile reception year and determines whether a necessary condition is met. In step S15-6-4, if the condition is not met, the subroutine ends in failure. Otherwise, in step S15-6-5 the header image processing module 13a carries out a similar comparison process for the month and date and determines whether necessary conditions are met. If the necessary conditions in step S15-6-6 are not met, the subroutine ends in failure.

If the year, month, and day conditions are met, in step S15-6-7 the header image processing module 13a determines whether the text data include a character string of the form 'xx:xx'. If so, in step S15-6-8 the subroutine returns information indicating that the header data comparison has succeeded; otherwise, the subroutine ends in failure.

Figure 13:
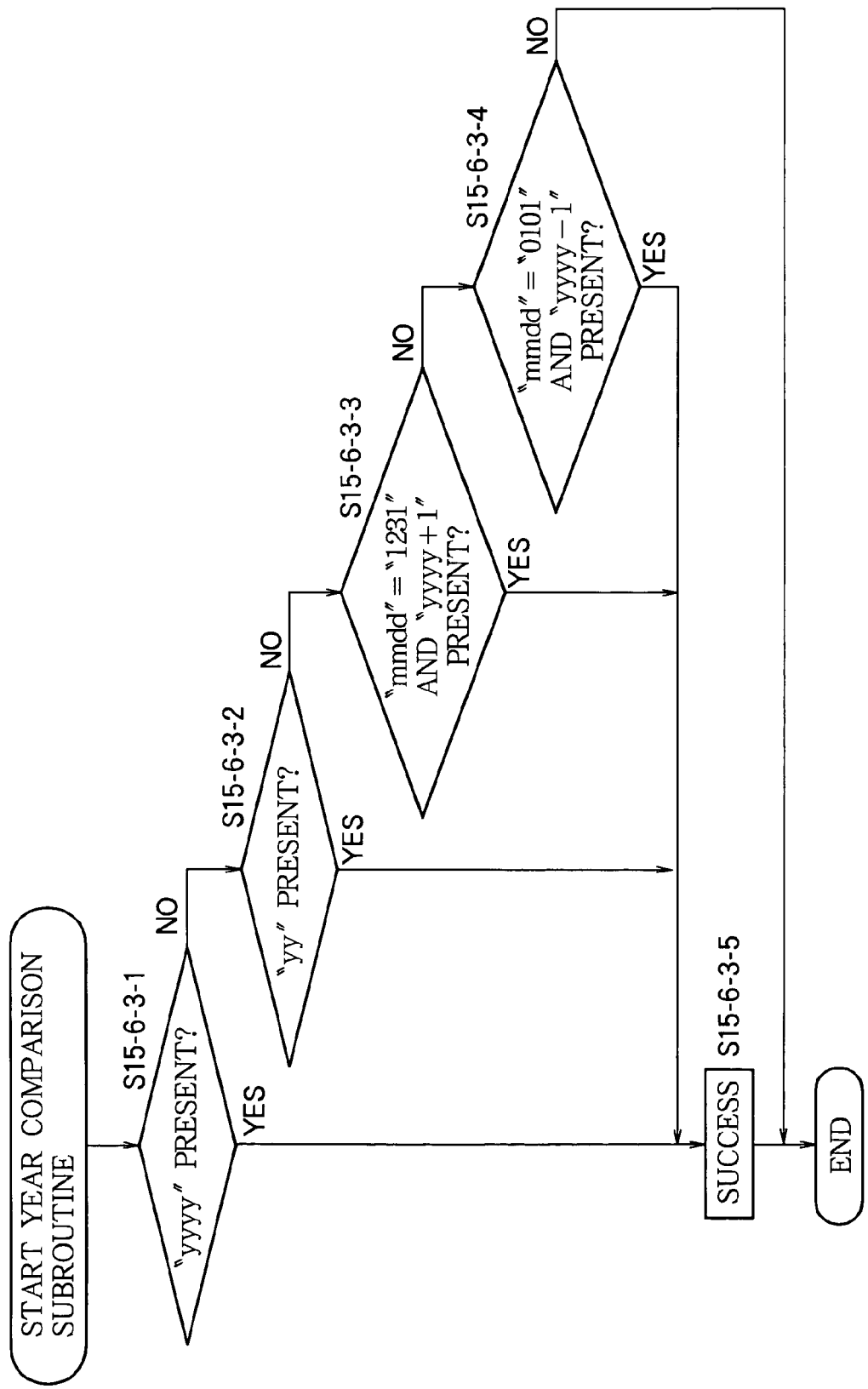
FIG. 13 is a more detailed flowchart illustrating the year comparison process in FIG. 12.

The year comparison subroutine in step S15-6-3 in FIG. 12 will now be described in further detail with reference to the flowchart in FIG. 13.

In step S15-6-3-1 the header image processing module 13a determines whether the presumed header text includes a character string 'yyyy' matching the four-digit year of facsimile reception. If so, in step S15-6-3-5 the subroutine returns information indicating that the year comparison has succeeded.

If there is no character string 'yyyy' matching the year of reception, in step S15-6-3-2 the header image processing module 13a determines whether there is a character string 'yy' matching the last two digits of the year of reception. If so, in step S15-6-3-5 the subroutine returns information indicating success. If not, the subroutine proceeds to step S15-6-3-3.

In the step S15-6-3-3, the header image processing module 13a determines whether the month and day (mmdd) of facsimile reception are December 31st (1231) and the presumed header text includes a character string matching the next year (yyyy+1 or yy+1; for brevity, only yyyy+1 is indicated in the drawing). If so, in step S15-6-3-5 the subroutine returns information indicating success. If these two conditions are not both met, the subroutine proceeds to step S15-6-3-4.

In step S15-6-3-4, the header image processing module 13a determines whether the month and day (mmdd) of facsimile reception are January 1st (0101) and whether the presumed header text includes a two- or four-digit character string matching the preceding year one (e.g., yyyy−1). If so, in step S15-6-3-5 the subroutine returns information indicating success. If these two conditions are not both met, the subroutine ends in failure.

The month and date comparison subroutine in step S15-6-5 in FIG. 12 will be described in further detail with reference to the flowchart in FIG. 14.

In step S15-6-5-1 the header image processing module 13a determines whether the presumed header text includes a day-month character string (dd/mm) matching the day and month of facsimile reception. If so, in step S15-6-5-8 the subroutine returns information indicating that the month and date comparison has succeeded.

If there is no matching day-month character string (dd/mm), in step S15-6-5-2 the header image processing module 13a determines whether the presumed header text includes a month-day character string (mm/dd) matching the month and day of facsimile reception. If so, in step S15-6-5-8 the subroutine returns information indicating success.

If there is no matching month-day character string (mm/dd), the header image processing module 13a retrieves the facsimile reception time (HHMM) from the facsimile reception time storage area 14c in step S15-6-5-3, and determines in step S15-6-5-4 whether the hour (HH) of reception time is '23' (23 o'clock) and the presumed header text includes a day-month character string matching the next day (usually dd+1/mm; other cases, i.e., 01/mm+1 if the facsimile was received on the last day of the month, or 01/01 if the facsimile was received on the last day of the year, are omitted from the drawings for simplicity). If so, in step S15-6-5-8 the subroutine returns information indicating success.

If there is no matching day-month character string (dd+1/mm etc.) in step S15-6-5-4, in step S15-6-5-5 the header image processing module 13a determines whether the hour (HH) in the facsimile reception time data is '23' (23 o'clock) and the presumed header text includes a month-day character string (mm/dd+1 etc.) matching the next day. If so, in step S15-6-5-8 the subroutine returns information indicating success.

If there is no matching month-day character string (mm/dd+1 etc.) in step S15-6-5-5, in step S15-6-5-6 the header image processing module 13a determines whether the hour (HH) in the facsimile reception time and date data is '00' (midnight) and the presumed header text includes a day-month character string (dd−1/mm etc.) matching the preceding day. If so, in step S15-6-5-8 the subroutine returns information indicating success.

If there is no matching day-month character string (dd−1/mm etc.) in step S15-6-5-6, in step S15-6-5-7 the header image processing module 13a determines whether the hour (HH) in the facsimile reception time and date data is '00' (midnight) and the presumed header text includes a month-day character string (mm/dd−1 etc.) matching the preceding day. If so, in step S15-6-5-8 the subroutine returns information indicating success.

If there is no matching month-day character string (mm/dd−1 etc.) in step S15-6-5-7, the subroutine ends in failure.

The watermark need not be positioned as shown in FIG. 9C. For example, it may be printed in a normally unoccupied margin at the edge of the printing medium.

In a variation of the second embodiment, instead of being printed by the same electrophotographic process as the facsimile image data, the watermark is printed by a different process, such as an embossing process carried out by an impact print head without use of toner.

By converting the header information to text data and printing the converted header information in the form of a watermark, the second embodiment enables all of the original document image to be reproduced while retaining the useful header information. Accordingly, legal documents and technical drawings can be fully reproduced without the loss of header information, and without the need for double sided printing.

Third Embodiment

Referring to FIG. 15, the receiving facsimile machine 10 in the third embodiment has the same structure as in the second embodiment, except that the ROM 13 includes an image data recombining module 13e instead of the watermark processing module 13d in the second embodiment. The image data recombining module 13e moves the header to a blank part of the original image, if a blank part is available.

The communication procedure between the transmitting facsimile machine 20 and the receiving facsimile machine 10 is the same as in the preceding embodiments, so a description will be also omitted.

As in the second embodiment, the received facsimile image data are received by the facsimile reception processor 12 and stored in the image data storage area 14a. The reception starting time and date of the facsimile reception are stored in the facsimile reception time storage area 14c. The header image processing module 13a searches for header information in the image data stored in the image data storage area 14a, modifies the stored data by removing the header information, stores the resulting modified facsimile image data in the image data storage area 14a again, and stores the removed header information in the header image storage area 14b. Next, unlike the second embodiment, the image data recombining module 13e searches the modified facsimile image data stored in the image data storage area 14a for a blank space large enough to hold the header information, and the image data recombining module 13e places the removed header information in the blank space.

The header information search algorithm is the same as in the first and second embodiments, but the OCR output is used directly in making date comparisons; the character strings in the header body are not stored in text form in the ROM 14.

The comparison in the header information search is carried out on the assumption that the character strings in the header body include the facsimile transmission time and date.

The facsimile transmission time and date data are searched for by using the starting time and date of the facsimile reception stored in the facsimile reception time storage area 14c. For the year of transmission, the header information must include the four-digit (yyyy) or two-digit (yy) year of reception indicated in the facsimile reception time storage area 14c.

If the day of reception is the first or last day of the year, however, the preceding or following year is also accepted, as in the second embodiment.

For month and day data, the header must include the month and day (mm/dd or dd/mm) indicated in the facsimile reception time storage area 14c. If the hour of reception is '00' or '23', however, the preceding or following day is also accepted as in the second embodiment.

For time data, whether the header includes a pair of two-digit numbers separated by a colon (xx:xx) is checked, as in the second embodiment.

The search for space to embed the header in the modified image data begins from the top of the modified image data. When a blank line is found, the number of consecutive blank lines is counted. If there are at least as many consecutive blank lines as the number of header lines that were removed, the header information is added at this position and the process ends; otherwise, the search continues and a similar process is carried when the next blank line is found. If sufficient space for printing the header is not found by the end of the page, the process ends in failure.

Figure 16A:
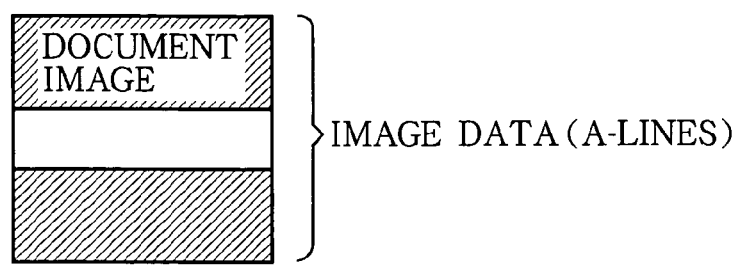
FIGS. 16A, 16B, and 16C illustrate the adding of header information and the restoration of the original image data in the third embodiment.
Figure 16B:
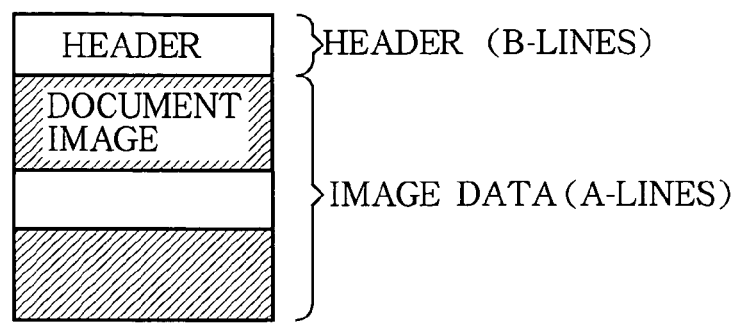
Figure 16C:
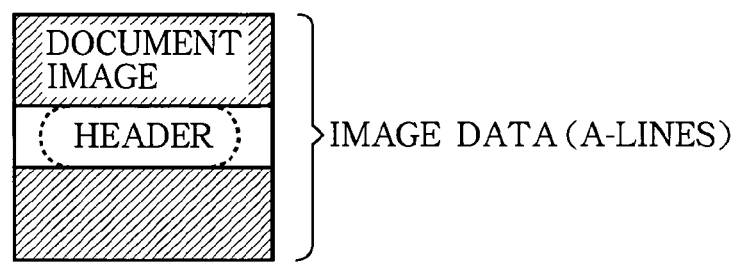

The general operation of the third embodiment is illustrated in FIGS. 16A to 16C. FIG. 16A depicts the image data before the original data is transmitted from the transmitting facsimile machine, consisting only of A-lines without header information, but including an internal blank space; FIG. 16B depicts the image data received by the receiving facsimile machine, consisting of both A-lines and B-lines (header information); FIG. 16C depicts the image data modified by moving the header from its position at the top of the page to the internal blank space, in the area enclosed by the dotted line.

Figure 17:
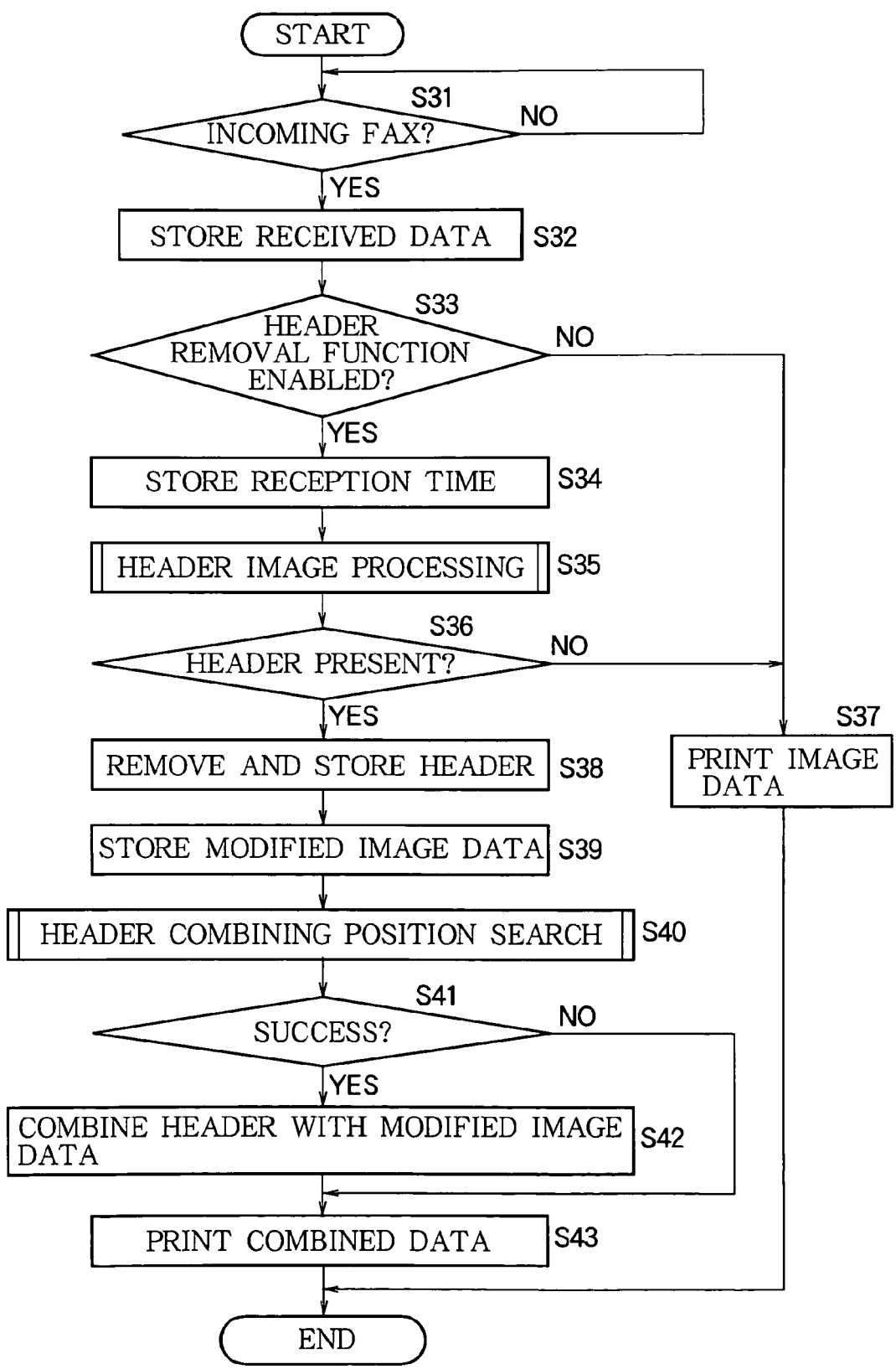
FIG. 17 is a flowchart illustrating the operation of the facsimile machine in the second embodiment.

The overall operation of the receiving facsimile machine 10 in the third embodiment is shown in the flowchart in FIG. 17.

In step S31 the facsimile reception processor 12 checks the telephone line to detect an incoming facsimile transmission from the transmitting facsimile machine 20. This step is repeated until an incoming facsimile transmission is detected; then the facsimile reception processor 12 proceeds to step S32.

In step S32 the facsimile reception processor 12 stores the received facsimile image data in the image data storage area 14a.

In step S33 the switch or other means mentioned in the first embodiment is checked to see whether the header removal function is enabled or disabled.

If the header removal function is enabled, then in step S34, the header image processing module 13a obtains the facsimile reception time from the current time processing module 13c, stores it in the facsimile reception time storage area 14c, and proceeds to step S35.

In step S35 the header image processing module 13a searches for header information in the received facsimile image data. In step S36, from the result of the search, the header image processing module 13a decides whether a header is present or absent.

If a header is determined to be absent in step S36, or if the header removal function is disabled in step S33, then in step S37, the printing controller 16 reads the facsimile image data from the image data storage area 14a and passes the facsimile image data to the printing engine 15, which prints the facsimile data without modification.

If the header removal function is enabled and a header is present, then in step S38, following the decision in step S36, the header image processing module 13a modifies the facsimile image data by removing the header lines and stores the removed header lines as image data in the header image storage area 14b.

In step S39 the header image processing module 13a stores the modified facsimile image data, without the header, in the image data storage area 14a.

In step S40 the header image processing module 13a searches for a header combining position in the modified facsimile image data. In step S41, the header image processing module 13a decides whether the search was successful, and if so, proceeds to step S42. If the search was unsuccessful, step S42 is skipped.

In step S42 the image data recombining module 13e combines the header image stored in the header image storage area 14b with the modified facsimile image data stored in the image data storage area 14a and stores the resulting combined data in the image data storage area 14a again.

In step S43 the printing controller 16 reads the facsimile image data from the image data storage area 14a and the printing engine 15 prints the modified facsimile image, with or without the re-embedded header.

Figure 18:
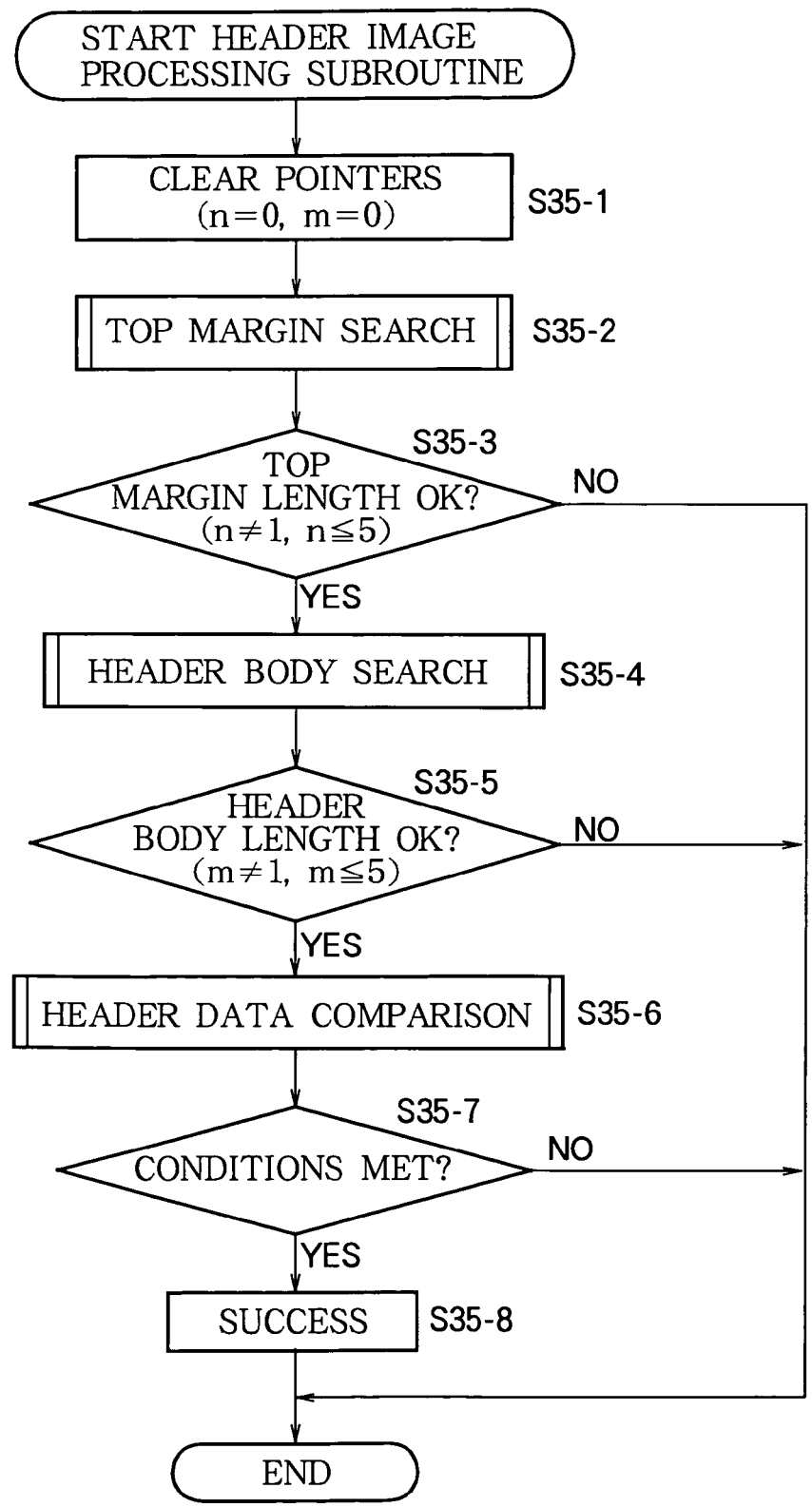
FIG. 18 is a more detailed flowchart illustrating the search process in FIG. 17.

The header search subroutine in step S35 in FIG. 17 will now be described in further detail with reference to the flowchart in FIG. 18.

In step S35-1 the header image processing module 13a clears two pointers designated by the letters m and n to zero (n=0, n=0), as in the preceding embodiments.

In step S35-2 the header image processing module 13a measures the top margin of the facsimile image by advancing pointer n up to the first non-blank line.

In step S15-3 the header image processing module 13a decides whether the length of the top margin is within the prescribed limits for a header (one to four lines). If it is not, the subroutine ends in failure. If the top margin length is within the prescribed limits, the subroutine proceeds to step S35-4.

In step S15-4 the header image processing module 13a measures the length of the header body by advancing pointer m from the first non-blank line up to the next blank line.

In step S35-5 the header image processing module 13a decides whether the length of the header body is within the prescribed limits for a header (one to four lines). If it is not, the subroutine ends in failure. If the header body length is within the prescribed limits, the subroutine proceeds to step S35-6.

In step S35-6 the header image processing module 13a compares the presumed header data with predetermined conditions.

In step S15-7 the header image processing module 13a decides whether the predetermined conditions are met. If the conditions are met, the subroutine to step S35-8; otherwise, the subroutine ends in failure.

In step S35-8 the subroutine returns information indicating that the header search has succeeded, and then ends.

The operation of the top margin search subroutine and header body search subroutine is the same as in the first embodiment, so descriptions will be omitted.

Figure 19:
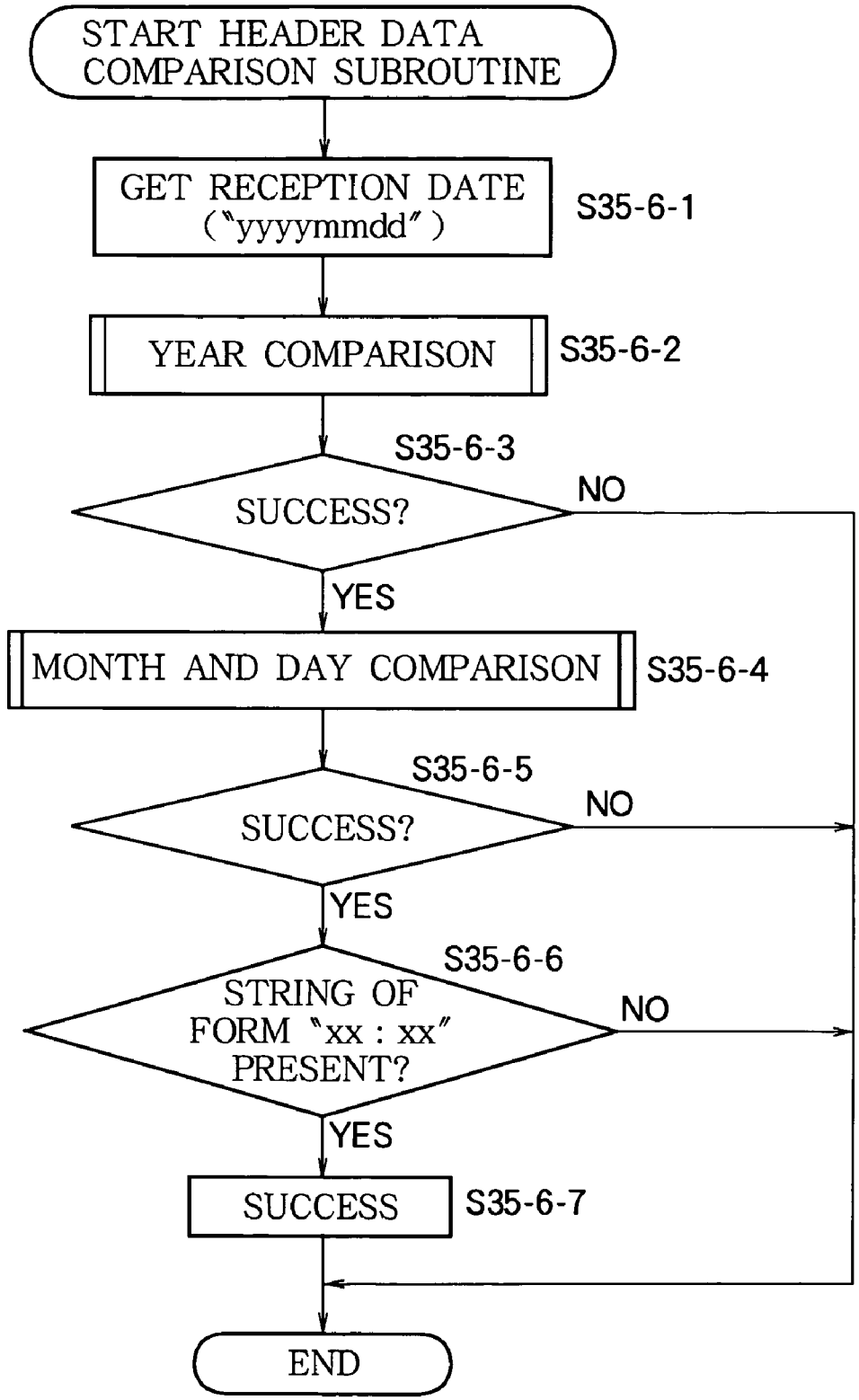
FIG. 19 is a more detailed flowchart illustrating the character string comparison process in FIG. 18.

The header data comparison subroutine in step S35-6 in FIG. 18 will now be described in further detail with reference to the flowchart in FIG. 19.

In step S35-6-1 the header image processing module 13a retrieves the facsimile reception time and date from the facsimile reception time storage area 14c. In step S35-6-2 the header image processing module 13a compares the presumed header information with the facsimile reception year and determines whether a necessary condition is met. In step S35-6-3, if the condition is not met, the subroutine ends in failure. Otherwise, the header image processing module 13a carries out a similar comparison process on the month and date in the presumed header information and determines whether necessary conditions are met in step S35-6-4. In step S35-6-5, if the conditions are not met, the subroutine ends in failure. Otherwise, the subroutine proceeds to step S35-6-6. In step 35-6-6 the header image processing module 13a determines whether the header information includes a character string of the form 'xx:xx'. If so, in step S35-6-7 the subroutine returns information indicating success; otherwise, the subroutine ends in failure.

Figure 20:
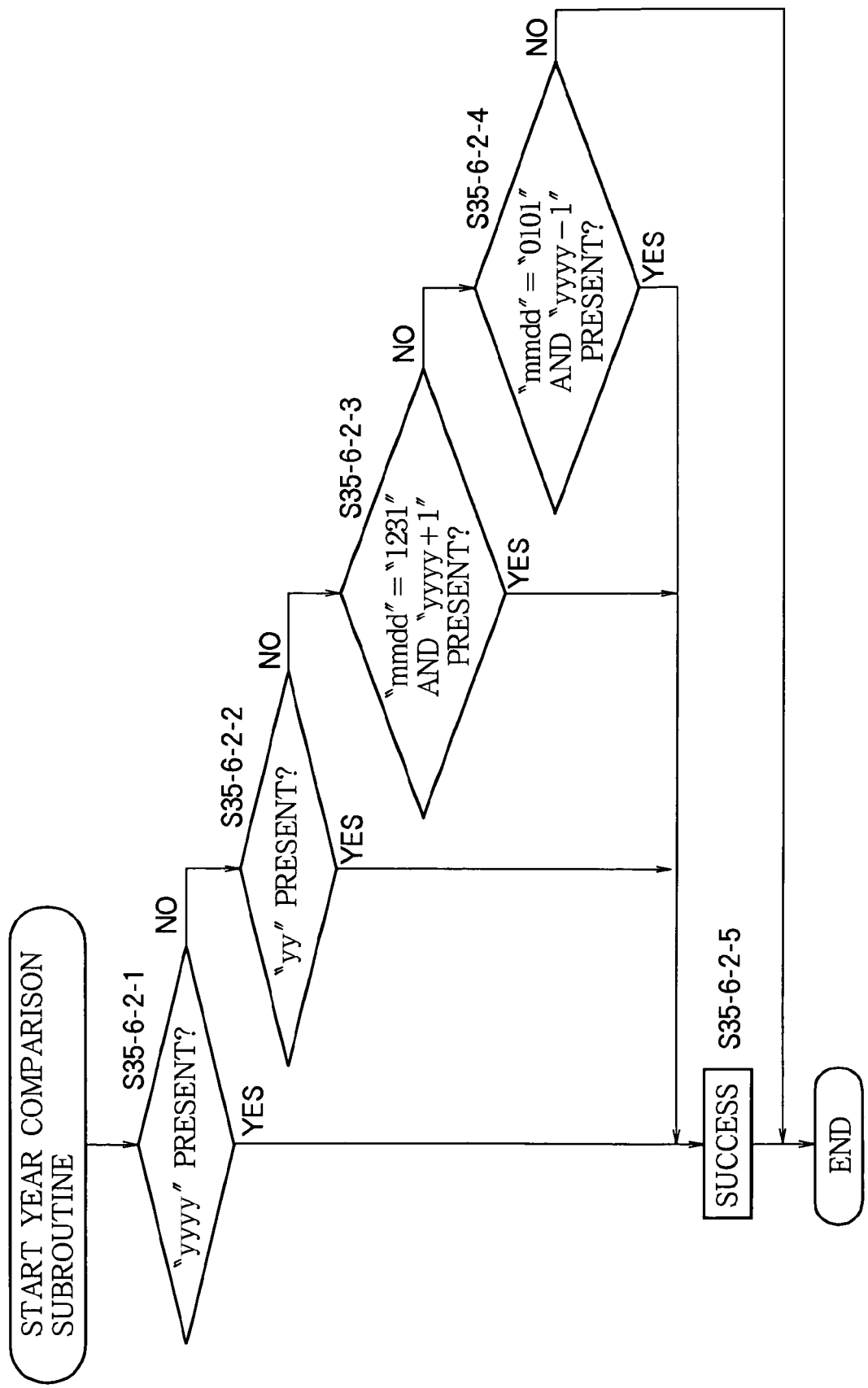
FIG. 20 is a more detailed flowchart illustrating the year comparison process in FIG. 19.

The year comparison subroutine in step S35-6-2 in FIG. 19 will now be described in further detail with reference to the flowchart in FIG. 20.

In step S35-6-2-1 the header image processing module 13a determines whether the presumed header information includes a character string 'yyyy' matching the four-digit year in the facsimile reception time and date data. If so, in step S35-6-2-5 the subroutine returns information indicating that the year comparison has succeeded.

If there is no character string 'yyyy' matching the year of reception, in step S35-6-2-2 the header image processing module 13a determines whether there is a character string 'yy' matching the last two digits of the year of reception. If so, in step S35-6-2-5 the subroutine returns information indicating success. If not, the subroutine proceeds to step S35-6-2-3.

In the step S35-6-2-3, the header image processing module 13a determines whether the month and day (mmdd) of facsimile reception are December 31st (1231) and the presumed header text includes a two- or four-digit character string matching the next year (e.g., yyyy+1). If so, in step S35-6-2-5 the subroutine returns information indicating success. If these two conditions are not both met, the subroutine proceeds to step S35-6-2-4.

In step S35-6-2-4, the header image processing module 13a determines whether the month and day (mmdd) of facsimile reception are January 1st (0101) and whether the presumed header text includes a two- or four-digit character string matching the preceding year one (e.g., yyyy−1). If so, in step S35-6-2-5 the subroutine returns information indicating success. If these two conditions are not both met, the subroutine ends in failure.

Figure 21:
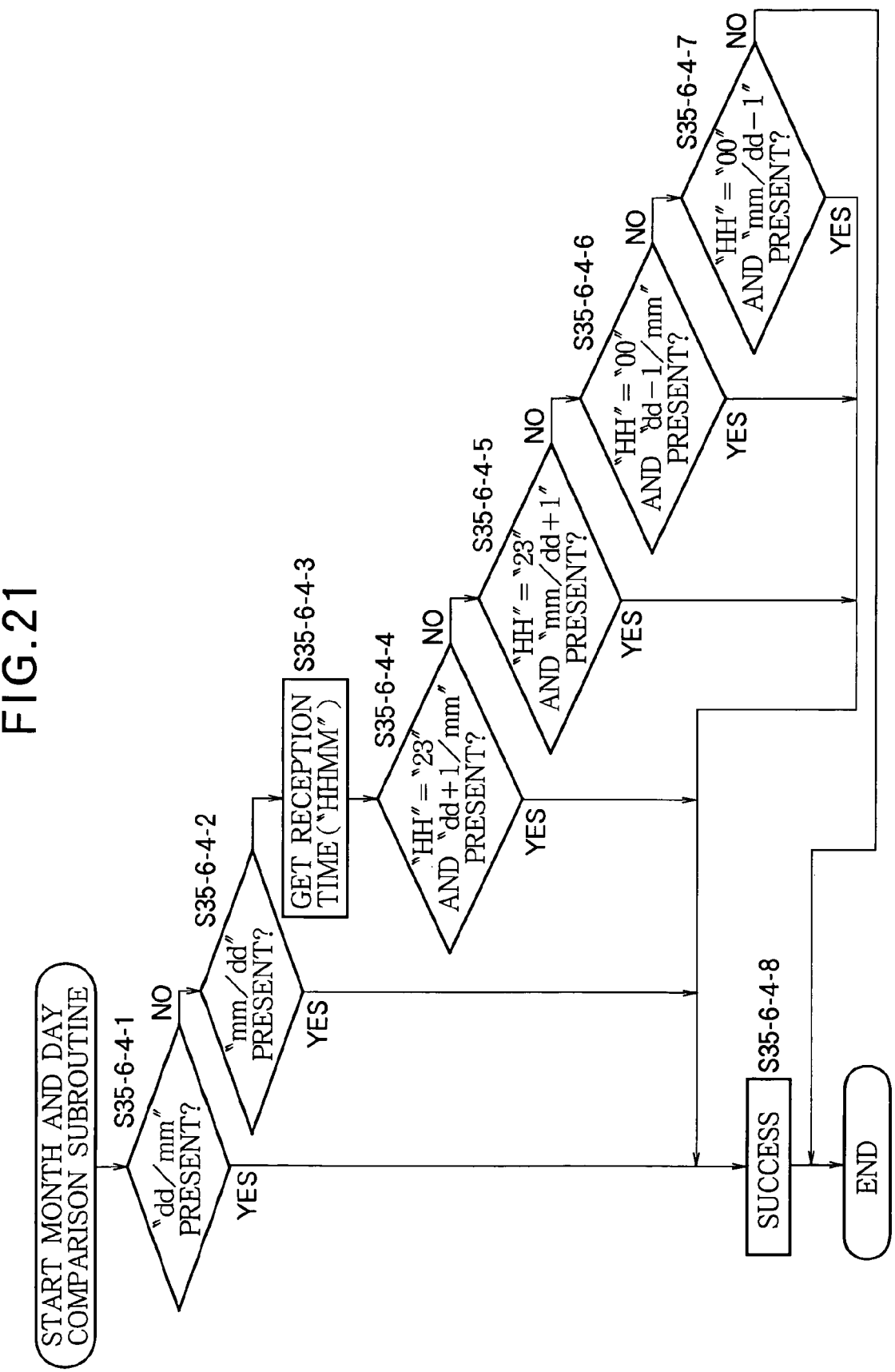
FIG. 21 is a more detailed flowchart illustrating the month and day comparison process in FIG. 19.

The month and date comparison subroutine in step S35-6-4 in FIG. 19 will be described in further detail with reference to the flowchart in FIG. 21.

In step S35-6-4-1 the header image processing module 13a determines whether the presumed header includes a day-month character string (dd/mm) matching the day and month of facsimile reception. If so, in step S35-6-4-8 the subroutine returns information indicating that the month and date comparison has succeeded.

If there is no matching day-month character string (dd/mm), in step S35-6-4-2 the header image processing module 13a determines whether the presumed header text includes a month-day character string (mm/dd) matching the month and day of facsimile reception. If so, in step S35-6-4-8 the subroutine returns information indicating success.

If there is no matching month-day character string (mm/dd), the header image processing module 13a retrieves the facsimile reception time (HHMM) from the facsimile reception time storage area 14c in step S35-6-4-3, and determines in step S35-6-4-4 whether the hour (HH) of reception time is '23' (23 o'clock) and the presumed header text includes a day-month character string matching the next day (e.g., dd+1/mm). If so, in step S35-6-4-8 the subroutine returns information indicating success.

If there is no matching day-month character string (dd+1/mm etc.) in step S35-6-4-4, in step S35-6-4-5 the header image processing module 13a determines whether the hour (HH) in the facsimile reception time data is '23' (23 o'clock) and the presumed header text includes a month-day character string (mm/dd+1 etc.) matching the next day. If so, in step S35-6-4-8 the subroutine returns information indicating success.

If there is no matching month-day character string (mm/dd+1 etc.) in step S35-6-4-5, in step S35-6-4-6 the header image processing module 13*a* determines whether the hour (HH) in the facsimile reception time and date data is '00' (midnight) and the presumed header text includes a day-month character string (dd−1/mm etc.) matching the preceding day. If so, in step S35-6-4-8 the subroutine returns information indicating success.

If there is no matching day-month character string (dd−1/mm etc.) in step S35-6-4-6, in step S35-6-4-7 the header image processing module 13*a* determines whether the hour (HH) in the facsimile reception time and date data is '00' (midnight) and the presumed header text includes a month-day character string (mm/dd−1 etc.) matching the preceding day. If so, in step S35-6-4-8 the subroutine returns information indicating success.

If there is no matching month-day character string (mm/dd−1 etc.) in step S35-6-4-7, the subroutine ends in failure.

Figure 22:
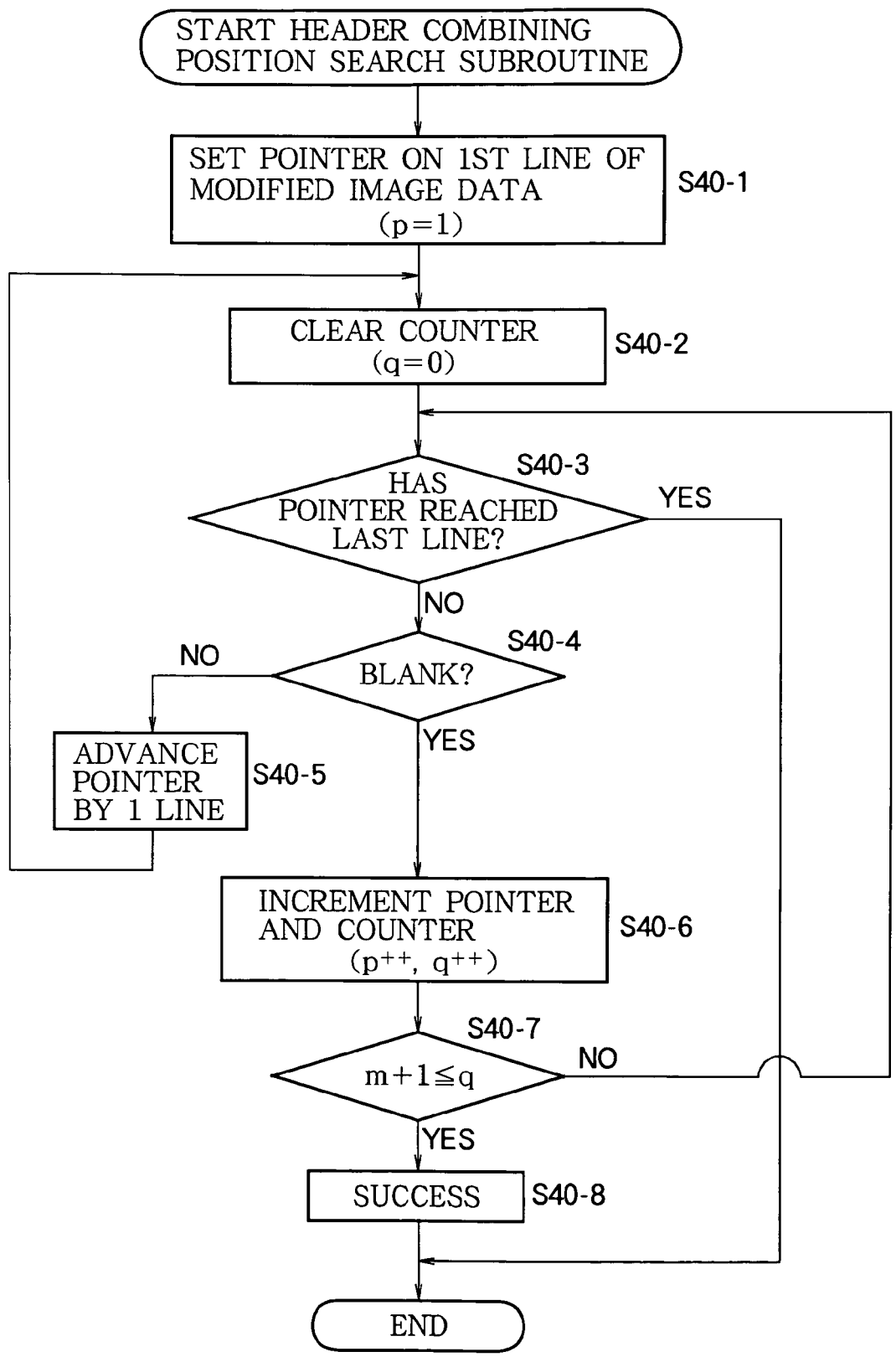
FIG. 22 is a more detailed flowchart illustrating the header combining position search process in FIG. 17.

The header combining position search subroutine in step S40 in FIG. 17 will now be described in further detail with reference to the flowchart in FIG. 22.

In step S40-1 the header image processing module 13*a* sets a search pointer p to one (1), thereby initializing it to the first line of the modified facsimile image data. In step S40-2 the header image processing module 13*a* clears a counter variable q to zero (0). The counter variable q is used to count consecutive blank lines in the modified facsimile image data.

In step S40-3 the header image processing module 13*a* determines whether the search pointer p has reached the last line of the modified facsimile image data. If so, the subroutine ends in failure. If not, in step S40-4 the header image processing module 13*a* determines whether the line currently indicated by the search pointer p is a blank line. If the current line is not blank, in step S40-5 the header image processing module 13*a* advances the search pointer one line, that is, increments the value of the search pointer p by one (1), returns to step S40-2, clears the counter q to zero (0), and resumes the search process.

If the current line is blank, in step S40-6 the header image processing module 13*a* increments the values of both the search pointer p and counter q by one (1). In step S40-7 the header image processing module 13*a* determines whether the value of the counter q is equal to or greater than the number of lines of header information to be combined, including the header body (m−1 lines) plus one preceding and one following blank line (m+1 lines in all). If this condition (m+1≦q) is not satisfied, the subroutine returns to step S40-3 to test the next line. Otherwise, in step S401-8 the subroutine returns information indicating that the header combining position search has succeeded.

By re-embedding the header in an appropriate blank space in the modified facsimile image data, when such a blank space is available, the receiving facsimile machine 10 in the third embodiment can reproduce both the header and a full and clear copy of the original document page. Legal documents, technical drawings, and the like are faithfully reproduced, since the header image does not even slightly obscure any part of the original image.

In the description of the third embodiment given above, the header image is simply copied into a blank space. In a variation of the third embodiment, the header is converted to text data as in the second embodiment, and then printed in a blank space, if available, with a distinctive font, character size, and/or color.

In a further variation, if the facsimile machine has a double sided printing function, the header information is printed on the reverse side of the printing medium.

Those skilled in the art will recognize that further variations are possible within the scope of the invention, which is defined in the appended claims.

What is claimed is:

1. A communication device for forming an image from image data received from a transmitting device, the communication device comprising:
   a receiving unit for receiving the image data, the image data including first image data and second image data received following the first image data, the first image data including transmitting device information about the transmitting device, the second image data having been processed by the transmitting device;
   a memory unit for storing the first image data and the second image data as one item of continuous image data;
   an image processing unit for shortening the continuous image data stored in the memory unit by removing the transmitting device information, thereby obtaining modified image data, and outputting the modified image data; and
   an image forming unit for using the modified image data output by the image processing unit to form an image,
   wherein to detect the transmitting device information image in the stored continuous image data, the image processing unit counts consecutive blank lines and consecutive non-blank lines.

2. The communication device of claim 1, wherein the image processing unit removes the transmitting device information in units of lines, thereby shortening the continuous image data in units of lines.

3. The communication device of claim 1, wherein by removing the transmitting device information, the image processing unit shortens the image formed by the image forming unit.

4. The communication device of claim 1, wherein by shortening the continuous image data, the image processing unit enables all of the second image data to be recorded on a recording medium.

5. The communication device of claim 1, wherein the image processing unit also creates a watermark from the transmitting device information, and combines the watermark with the continuous image data after removing the transmitting device information, so that the modified image data includes the watermark.

6. The communication device of claim 1, wherein to detect the transmitting device information image in the stored continuous image data, the image processing unit also searches for characters indicating a time and date of transmission of the continuous image data.

7. A communication device for forming an image from image data received from a transmitting device, the communication device comprising:
   a receiving unit for receiving the image data, the image data including first image data and second image data received following the first image data, the first image data including transmitting device information about the transmitting device, the second image data having been processed by the transmitting device;
   a memory unit for storing the first image data and the second image data as one item of continuous image data;

an image processing unit for shortening the continuous image data stored in the memory unit by removing the transmitting device information, thereby obtaining modified image data, and outputting the modified image data; and an image forming unit for using the modified image data output by the image processing unit to form an image, wherein the image processing unit also creates a watermark from the transmitting device information, and combines the watermark with the continuous image data after removing the transmitting device information, so that the modified image data includes the watermark, and wherein the image processing unit converts the transmitting device information to text data by optical character recognition and creates the watermark from the text data.

8. The communication device of claim 7, wherein the image processing unit removes the transmitting device information in units of lines, thereby shortening the continuous image data in units of lines.

9. The communication device of claim 7, wherein by removing the transmitting device information, the image processing unit shortens the image formed by the image forming unit.

10. The communication device of claim 7, wherein by shortening the continuous image data, the image processing unit enables all of the second image data to be recorded on a recording medium.

11. A communication device for forming an image from image data received from a transmitting device, the communication device comprising:

a receiving unit for receiving the image data, the image data including first image data and second image data received following the first image data, the first image data including transmitting device information about the transmitting device, the second image data having been processed by the transmitting device;

a memory unit for storing the first image data and the second image data as one item of continuous image data;

an image processing unit for shortening the continuous image data stored in the memory unit by removing the transmitting device information, thereby obtaining modified image data, and outputting the modified image data; and an image forming unit for using the modified image data output by the image processing unit to form an image, wherein the image processing unit also stores the transmitting device information as third image data in the memory unit, searches the modified image data for a blank space large enough to hold the third image data, and embeds the third image data in the blank space, if found, thereby converting the blank space to an image of the transmitting device information in the image formed using the modified image data.

12. The communication device of claim 11, wherein the image processing unit converts the third image data to text data by optical character recognition and embeds the third image data in the blank space as text data.

13. The communication device of claim 11, wherein the image processing unit removes the transmitting device information in units of lines, thereby shortening the continuous image data in units of lines.

14. The communication device of claim 11, wherein by removing the transmitting device information, the image processing unit shortens the image formed by the image forming unit.

15. The communication device of claim 11, wherein by shortening the continuous image data, the image processing unit enables all of the second image data to be recorded on a recording medium.

16. A communication device comprising:

a receiving unit for receiving facsimile image data;

a memory unit for storing the facsimile image data received by the receiving unit;

an image processing unit for searching in the stored facsimile image data for header information added at a source of a transmission of the facsimile image data, modifying the received facsimile image data by removing the header information, if found, to generate modified facsimile image data, and storing the modified facsimile image data in the memory unit; and a recording unit for recording a facsimile image on a recording medium by using the modified facsimile image data, wherein the image processing unit also creates a watermark from the header information, and combines the watermark with the facsimile image data after removing the header information, so that the modified facsimile image data includes the watermark, and wherein the image processing unit converts the header information to text data by optical character recognition and creates the watermark from the text data.

17. The communication device of claim 16, wherein by removing the header information, the image processing unit shortens the facsimile image recorded on the recording medium.

18. The communication device of claim 16, wherein by shortening the facsimile image recorded, the image processing unit enables all of the facsimile image to be recorded on the recording medium.

19. A communication device comprising:

a receiving unit for receiving facsimile image data;

a memory unit for storing the facsimile image data received by the receiving unit;

an image processing unit for searching in the stored facsimile image data for header information added at a source of a transmission of the facsimile image data, modifying the received facsimile image data by removing the header information, if found, to generate modified facsimile image data, and storing the modified facsimile image data in the memory unit; and a recording unit for recording a facsimile image on a recording medium by using the modified facsimile image data, wherein the image processing unit also stores the header information as header image data in the memory unit, searches the modified facsimile image data for a blank space large enough to hold the header image data, and embeds the header image data in the blank space, if found, thereby converting the blank space to an image of the header information in the modified facsimile image data.

20. The communication device of claim 19, wherein by removing the header information, the image processing unit shortens the facsimile image recorded on the recording medium.

21. The communication device of claim 19, wherein by shortening the facsimile image recorded, the image processing unit enables all of the facsimile image to be recorded on the recording medium.

22. The communication device of claim 19, wherein the image processing unit converts the header image data to text data by optical character recognition and embeds the header image data in the blank space as text data.

23. A communication device comprising:
a receiving unit for receiving facsimile image data;
a memory unit for storing the facsimile image data received by the receiving unit;
an image processing unit for searching in the stored facsimile image data for header information added at a source of a transmission of the facsimile image data, modifying the received facsimile image data by removing the header information, if found, to generate modified facsimile image data, and storing the modified facsimile image data in the memory unit; and
a recording unit for recording a facsimile image on a recording medium by using the modified facsimile image data,
wherein to detect the header information image in the stored facsimile image data, the image processing unit counts consecutive blank lines and consecutive non-blank lines.

24. The communication device of claim 23, wherein by removing the header information, the image processing unit shortens the facsimile image recorded on the recording medium.

25. The communication device of claim 23, wherein by shortening the facsimile image recorded, the image processing unit enables all of the facsimile image to be recorded on the recording medium.

26. The communication device of claim 23, wherein to detect the header information image in the stored facsimile image data, the image processing unit also searches for characters indicating a time and date of transmission of the facsimile image data.

27. The communication device of claim 23, wherein the image processing unit also creates a watermark from the header information, and combines the watermark with the facsimile image data after removing the header information, so that the modified facsimile image data includes the watermark.

* * * * *